(12) United States Patent
Bulthuis et al.

(10) Patent No.: US 7,397,986 B2
(45) Date of Patent: Jul. 8, 2008

(54) OPTICAL DEVICE WITH REDUCED TEMPERATURE DEPENDENCE

(75) Inventors: Hindrick Freerk Bulthuis, Edinburgh (GB); Tony C. Kowalczyk, Palo Alto, CA (US); Michael G. Jubber, Longridge (GB)

(73) Assignee: Gemfire Corporation, Fremont, CA (US)

( * ) Notice: Subject to any disclaimer, the term of this patent is extended or adjusted under 35 U.S.C. 154(b) by 0 days.

(21) Appl. No.: 11/073,032

(22) Filed: Mar. 4, 2005

(65) Prior Publication Data

US 2006/0198579 A1 Sep. 7, 2006

(51) Int. Cl.
G02B 6/34 (2006.01)
(52) U.S. Cl. ...................................... 385/37
(58) Field of Classification Search ................... 385/27, 385/37
See application file for complete search history.

(56) References Cited

U.S. PATENT DOCUMENTS

| | | | |
|---|---|---|---|
| 5,002,350 A | 3/1991 | Dragone | |
| 5,629,992 A | 5/1997 | Amersfoort et al. | |
| 5,732,171 A | 3/1998 | Michel et al. | |
| 5,799,118 A | 8/1998 | Ogusu et al. | |
| 5,937,113 A | 8/1999 | He et al. | |
| 5,978,539 A | 11/1999 | Davies et al. | |
| 6,055,349 A | 4/2000 | Seino et al. | |
| 6,118,909 A | 9/2000 | Chen et al. | |
| 6,137,939 A | 10/2000 | Henry et al. | |
| 6,169,838 B1 * | 1/2001 | He et al. | 385/129 |
| 6,181,848 B1 | 1/2001 | Bruno et al. | |
| 6,212,323 B1 | 4/2001 | Harpin et al. | |
| 6,289,147 B1 | 9/2001 | Bulthuis et al. | |
| 6,304,687 B1 * | 10/2001 | Inoue et al. | 385/14 |
| 6,519,380 B2 * | 2/2003 | Dawes et al. | 385/14 |
| 6,542,666 B2 * | 4/2003 | Tsuda et al. | 385/37 |
| 6,574,409 B1 * | 6/2003 | Moroni et al. | 385/129 |
| 6,757,454 B2 | 6/2004 | Inoue et al. | |
| 6,768,842 B2 | 7/2004 | Bulthuis et al. | |
| 6,925,231 B2 * | 8/2005 | Lazaro Villa et al. | 385/37 |
| 6,985,656 B2 * | 1/2006 | Iazikov et al. | 385/37 |
| 7,013,065 B2 * | 3/2006 | Petermann et al. | 385/37 |

(Continued)

FOREIGN PATENT DOCUMENTS

EP 0907091 4/1999

(Continued)

OTHER PUBLICATIONS

K. Maru, K. Matsui, H. Ishikawa, Y. Abe, S. Kashimura, S. Himi and H. Uetsuka, "Super-High-Δ athermal arrayed waveguide grating with resin-filled trenches in slab region," Electronic Letters, vol. 40, No. 6, pp. 374-375, Mar. 18, 2004.

(Continued)

*Primary Examiner*—Ellen Kim
(74) *Attorney, Agent, or Firm*—Warren S. Wolfeld; Haynes Beffel & Wolfeld LLP

(57) ABSTRACT

Optical apparatus with improved center wavelength temperature stability. In an embodiment, an AWG has a plurality of slots inserted along the optical paths. The slots contain one or more compensation materials which collectively correct for an order Q temperature dependency of the AWG base material. Q>=2 or the number of compensation materials is at least 2 or both.

39 Claims, 11 Drawing Sheets

U.S. PATENT DOCUMENTS

| | | |
|---|---|---|
| 7,043,120 B2 * | 5/2006 | Wada et al. ............... 385/37 |
| 7,177,499 B2 * | 2/2007 | Johnson ..................... 385/37 |
| 7,187,818 B2 * | 3/2007 | Grobnic et al. ............. 385/14 |
| 7,194,162 B2 * | 3/2007 | Yan et al. ................... 385/37 |
| 2003/0039008 A1 | 2/2003 | Davies |
| 2003/0039441 A1 | 2/2003 | Kashihara et al. |
| 2003/0123799 A1 * | 7/2003 | Lazaro Villa ............... 385/37 |
| 2003/0156789 A1 | 8/2003 | Bhardwaj et al. |
| 2004/0170356 A1 | 9/2004 | Iazikov et al. |
| 2006/0078245 A1 * | 4/2006 | Yoneda ....................... 385/14 |

FOREIGN PATENT DOCUMENTS

| | | |
|---|---|---|
| EP | 0 919 840 A1 | 6/1999 |
| EP | 0919840 A1 | 6/1999 |
| EP | 1 089 098 A1 | 4/2001 |
| GB | 2370128 | 6/2002 |
| JP | 08-334639 | 7/1995 |
| JP | 09030251 | 2/1997 |
| JP | 11160559 | 6/1999 |
| JP | 2001-51138 | 2/2001 |
| JP | 2002-328243 | 11/2002 |
| JP | 2002-341163 | 11/2002 |
| KR | 20000064922 | 11/2000 |
| KR | 2005-10076 | 1/2005 |
| WO | WO 97/23969 | 7/1997 |
| WO | WO 98/13718 | 4/1998 |
| WO | WO 99/21038 | 4/1999 |
| WO | WO 01/07944 A3 | 2/2001 |
| WO | WO 01/07948 A1 | 2/2001 |
| WO | WO 01/07949 A1 | 2/2001 |
| WO | WO 01/07955 A1 | 2/2001 |
| WO | WO 01/07956 A1 | 2/2001 |
| WO | WO 03/025644 | 3/2003 |
| WO | 2006/073229 A1 | 7/2006 |

OTHER PUBLICATIONS

K. Maru, M. Ohkawa, H. Nounen, S. Takasugi, S. Kashimura, H. Okano and H. Uetsuka, "Athermal and Center Wavelength Adjustable Arrayed-Waveguide Grating," Optical Fiber Communication Conference 2000, Baltimore, MD, vol. 2, pp. 130-132, Mar. 7-10, 2000.

Smit, M. K., "Phasar-Based WDM-Devices: Principles, Design and Applications," IEEE Journal of Selected Topics in Quantum Electronics, vol. 2, No. 2, pp. 236-250, Jun. 1996.

A. Kaneko, S. Kamei, Y. Inoue, H. Takahashi and A. Sugita, "Athermal silica-based arrayed-waveguide grating (AWG) multi/demultiplexers with new low loss groove design," IEEE 2000, Electronics Letters Online No. 20000261, Dec. 20, 1999.

\* cited by examiner

OPTICAL DEVICE WITH REDUCED TEMPERATURE DEPENDENCE

BACKGROUND

1. Field of the Invention

The invention relates generally to optical grating devices, and more particularly to techniques for athermalizing such devices.

2. Description of Related Art

Computer and communication systems place an ever-increasing demand upon communication link bandwidths. It is generally known that optical fibers offer a much higher bandwidth than conventional coaxial links. Further, a single optical channel in a fiber waveguide uses a small fraction of the available bandwidth of the fiber. In wavelength division multiplexed (WDM) optical communication systems, multiple optical wavelength carriers transmit independent communication channels along a single optical fiber. By transmitting several channels at different wavelengths into one fiber, the bandwidth capability of an optical fiber is efficiently utilized.

Fiber-optic multiplexing and demultiplexing have been accomplished using an arrayed waveguide grating (AWG) device. An AWG is a planar structure comprising an array of waveguides disposed between input and output couplers and arranged side-by-side with each other, and which together act like a diffraction grating in a spectrometer. Each of the waveguides differs in length with respect to its nearest neighbor by a predetermined fixed amount. The outputs of the output coupler form the outputs of the multiplexing and demultiplexing device. In operation, when a plurality of separate and distinct wavelengths are applied to separate and distinct input ports of the device, they are combined and are transmitted to an output port. The same device may also perform a demultiplexing function in which a plurality of input wavelengths on one input port of the apparatus, are separated from each other and directed to predetermined different ones of the output ports. AWGs can also perform a routing function, in which signals arrive on multiple input ports and are routed to multiple different output ports in accordance with a predefined mapping. The construction and operation of such AWGs is well known in the art. See for example, "PHASAR-based WDM-Devices: Principles, Design and Applications", M K Smit, IEEE Journal of Selected Topics in Quantum Electronics Vol.2, No.2, June 1996, and U.S. Pat. No. 5,002,350 and WO97/23969, all incorporated by reference herein.

Wavelength division multiplexers and demultiplexers require precise control of the effective optical path length difference between adjacent waveguides. The effective optical path length difference is defined as the product of the effective index of refraction of the fundamental mode in the waveguide and the physical path length difference between adjacent waveguides. The effective index of refraction of the fundamental mode in the waveguides and the physical path length differences between adjacent waveguides for currently available wavelength division multiplexers and demultiplexers are typically both temperature dependent. In conventional integrated optical multiplexer and demultiplexer devices, the medium forming the arrayed waveguides has a noticeable temperature dependency which results in changes in the central transmission wavelength which may exceed the transmission bandwidth. As a result, temperature variations that are within a specified device operating temperature range (e.g. from about 0 C to about 70 C) induce a wavelength shift which is unacceptable in comparison to the typical accuracy requirements. Consequently, available multiplexer/demultiplexer optical devices of the phased array type are generally operated in a temperature controlled environment. Typically, control circuits with heating elements are provided to maintain the device at a stable temperature higher than the maximum specified operating temperature. But the use of heating elements to achieve active athermalization is undesirable because it increases the overall cost, size and complexity of the device, reduces device lifetimes, and consumes considerable power. It also usually requires active smart control electronics and even then it may operate differently depending on the device's physical horizontal/vertical orientation. Peltier coolers can also be used, but these suffer from many of the same inadequacies.

In the case of conventional wavelength division multiplexers having a phased array optical grating comprising a plurality of silica waveguides and silica cladding, the variation of channel wavelength as a function of temperature predominately depends on the positive variation of the effective index of refraction of the waveguides as a function of temperature. In an effort to compensate for the positive variation of refractive index as a function of temperature for silica-based materials, polymer overcladding materials having a negative variation of refractive index as a function of temperature have been employed. However, a problem with this arrangement is that as the temperature varies, the difference in refractive index between the core and the cladding varies, and in the worst case, light may not be able to be guided into the waveguide. As a result, optical multiplexer/demultiplexer devices having a phased array type grating with a polymer overcladding may not be suitable for use over a wide range of ambient temperatures.

Another proposed design for maintaining a relatively constant effective optical path length difference between adjacent waveguides in a phased array involves localizing a polymer in a triangular or crescent-shaped groove either in the phased array or in the slab region coupling the phased array with either the input or output fibers. The polymer can be selected such that it has a negative variation in effective index of refraction as a function of temperature to compensate for the positive variation in the index of refraction of the silica waveguide core segments as a function of temperature, thereby inhibiting shifting of channel wavelengths due to variations in operating temperature within a predetermined operating temperature range. The polymer groove can be divided into more than one groove encountered by the optical energy sequentially, to reduce the length of free space propagation across each groove.

The use of polymer-filled grooves can improve athermalization substantially. Typical AWGs that have been athermalized in this way can achieve a center channel wavelength drift as small as 0.03 to 0.05 nm over a typical operating temperature range of −5 to +70 C. However, that is still not good enough. Such drifts limit the applicability of the device to only that stated temperature range, and to only systems having channel spacings of about 100 GHz or higher, where this variation would be tolerable. They are not readily usable, for example, in an outdoor equipment enclosure in climates where freezing temperatures are possible, or in systems that require a broad passband and a channel spacing less than about 100 GHz.

Another major category of techniques that have been investigated for athermalization are mechanical in nature, such as techniques that include temperature-controlled actuators for actively positioning the components of the device relative to each other. These may include, for example, a bimetallic actuator that adjusts the lateral position of the input waveguide relative to the input slab region in accordance with ambient temperature. These techniques are generally complex and expensive to make as the manufacturing tolerances are usually extremely tight.

Accordingly, there is an urgent need for arrayed waveguide grating devices that exhibit much better athermalization over a wider temperature range than has previously been possible or practical, without requiring a temperature controlled environment, and without requiring the complexities and tight manufacturing tolerances of mechanical methods.

In existing polymer-filled groove athermalization methods, the change in refractive index of both the silica based waveguide material and the polymer compensation material, are both assumed to be linear with temperature. Any higher order effects typically are ignored. Most references that characterize the refractive index change of a material with respect to temperature, also state only a linear relationship between the two when measured at temperatures away from the glass transition temperature of the polymer. Applicants have recognized that the relationship is usually not exactly linear, and that the deviation of these variations from the linear may be responsible for a significant part of the imperfect athermalization observed in these devices. In an aspect of the invention, therefore, roughly stated, the selection of materials takes into account at least the second order effect of the materials. As a result, a polymer compensation material can be identified that compensates for the effective optical path length variation in the waveguide material with much better accuracy, or over a much wider temperature range of −30 C to +70 C for example, or both.

In another aspect of the invention, again roughly described, two different compensation materials are used for filling a plurality of slots or compensation regions inserted in the optical paths. The optical path length vs. temperature curves of the two compensation materials are characterized to at least the second order, as is that of the base waveguide material. The two compensation materials are placed in different numbers of the grooves in an appropriate ratio, so as to create the ratio of effective interaction lengths that is required to accurately minimize the temperature dependence of the overall optical path length to both the first and second order. The technique is generalizeable to any number of different compensation materials, and to neutralization of the optical path length temperature dependence to any order of characterization.

In one aspect of the invention, roughly described, optical apparatus has a plurality of passbands and a center wavelength, and the first through Q'th order derivatives with respect to temperature of the center wavelength, Q>=2, are substantially equal to zero throughout a temperature range of 0 C to +70 C, −5 C to +70 C, −30 C to +70 C, or −50 C to +90 C. The apparatus can include a plurality of optical paths carrying optical energy from the input port to the output port through a plurality of materials, each of the materials having an effective index of refraction temperature dependency which differs from that of the other materials. Alternatively or additionally, the apparatus can include a waveguide in optical communication with a particular one of the input and output ports, and a temperature compensation member that adjusts the physical position of the waveguide with respect to the arrayed waveguide grating in dependence upon temperature.

In another aspect of the invention, roughly described, optical apparatus has comprising a plurality of optical paths through a material system, each of the optical paths having a respective effective optical path length which differs from that of an adjacent optical path by a respective effective optical path length difference, and the first through Q'th order derivatives with respect to temperature of each of the optical path length differences, Q>=2, are substantially equal to zero throughout a temperature range of 0C to +70 C, −5 C to +70 C, −30 C to +70 C, or −50 C to +90 C. The apparatus can include a plurality of optical paths carrying optical energy from the input port to the output port through a plurality of materials, each of the materials having an effective index of refraction temperature dependency which differs from that of the other materials. Additionally, each x'th one of the materials can have a respective total physical propagation distance along each of the optical paths which differs from the total physical propagation distance through the x'th material along an adjacent one of the optical paths by a respective physical path length difference $\Delta L_x$, each of the $\Delta L_x$'s remaining substantially constant with temperature throughout the temperature range.

In another aspect of the invention, roughly described, optical apparatus has a plurality of optical paths through a material system, each of the optical paths traversing at least three materials, each of the materials having an effective index of refraction temperature dependency which differs from that of the other materials, each of the optical paths having a respective effective optical path length which differs from that of an adjacent optical path by a respective effective optical path length difference, and the first through Q'th order derivatives with respect to temperature of each of the optical path length differences, Q>=1, are substantially equal to zero throughout a temperature range of 0C to +70 C, −5 C to +70 C, −30 C to +70 C, or −50 C to +90 C. In an embodiment, each x'th one of the materials has a respective total physical propagation distance along each of the optical paths which differs from the total physical propagation distance through the x'th material along an adjacent one of the optical paths by a respective physical path length difference $\Delta L_x$, each of the $\Delta L_x$'s remaining substantially constant with temperature throughout the temperature range.

In another aspect of the invention, roughly described, an arrayed waveguide grating apparatus has a plurality of optical paths from an input to an output, comprising a base material and at least one compensation region, the at least one compensation region collectively containing at least first and second compensation materials intersecting the optical paths and having effective index of refraction temperature dependencies that differ from each other and from that of the base material. In one embodiment, a first one of the compensation regions includes both the first and second compensation materials. The first and second compensation materials can be disposed in different layers in the first compensation region. Alternatively, the first compensation region can further include a third compensation material, where the first compensation material is disposed in a lower layer in the first compensation region, the second compensation material is disposed in a middle layer in the first compensation region, and the third compensation material is disposed in an upper layer in the first compensation region, and where the second compensation material has an index of refraction higher than both that of the first and third compensation materials. Where the arrayed waveguide grating apparatus includes in the base material a lower cladding layer, a core layer superposing the lower cladding region and an upper cladding layer superposing the core layer, and the second compensation material can be is substantially coplanar with the core layer in the base material.

In another embodiment, roughly described, one of the compensation regions can include the first compensation material and not the second compensation material. In such an embodiment the at least one compensation region can collectively contain a plurality of compensation materials including the first and second compensation materials, all of the compensation materials in the plurality of compensation materials intersecting the optical paths and having effective index of refraction temperature dependencies that differ from each other and from that of the base material, and wherein each of the compensation regions includes exactly one of the compensation materials.

In either of the above embodiments, roughly described, the first compensation material can include a composite plurality of sub-materials, the effective index of refraction temperature dependence of the composite being the effective index of refraction of the first compensation material. The sub-materials can be layered to form the composite. Alternatively, a first one of the sub-materials can be the same as the base material and a second one of the sub-materials has an effective index of refraction temperature dependence that differs from that of the base material and from that of the composite.

In an embodiment, one of the compensation materials can further compensate for bi-refringence of the base material.

In another aspect of the invention, roughly described, an arrayed waveguide grating apparatus has a plurality of optical paths from an input to an output, including a base material and a plurality of compensation regions, a first subset of at least one of the compensation regions containing a first compensation material and a second subset of at least one of the slots containing a second compensation material, wherein the first and second compensation materials have effective index of refraction temperature dependencies that differ from each other and from that of the base material. In an embodiment, the base material might comprise a silica and the first and second compensation materials might be polymers.

In another aspect of the invention, roughly described, optical apparatus has a plurality of optical paths through a material system, each of the optical paths traversing a number X materials, and wherein $$\begin{pmatrix} n_{1,0} & n_{1,1} & \dots & n_{1,X-1} \\ n_{2,0} & n_{2,1} & \dots & n_{2,X-1} \\ \vdots & \vdots & & \vdots \\ n_{Q,0} & n_{Q,1} & \dots & n_{Q,X-1} \end{pmatrix} \begin{pmatrix} \Delta L_0 \\ \Delta L_1 \\ \vdots \\ \Delta L_{X-1} \end{pmatrix}$$

is substantially equal to zero, where each $n_{q,x}$ is a q'th derivative with respect to temperature of the effective index of refraction of each x'th one of the materials, where each $\Delta L_x$ is the total physical path length increment of the material x between adjacent optical paths, and wherein Q>=2 or X>=3 or both. In an embodiment, X>=Q+1. Where the X materials consist of a base material and X−1 compensation materials, the apparatus can include at least X−1 compensation regions formed in the base material, each of the compensation regions containing exactly one of the compensation materials, the compensation regions being allocated to the X−1 compensation materials substantially in proportion to the total physical path length increments $\Delta L_x$ of the compensation materials.

In another aspect of the invention, roughly described, optical apparatus has a plurality of optical paths through a base material having a first trench containing a different material intersecting the optical paths, and at least one of the upstream and downstream edges of the first trench is slanted relative to the vertical by a slant angle between 5 and 20 degrees. The base material may further have a second trench intersecting the optical paths, wherein both the upstream and downstream edges of both the first and second trenches are slanted relative to the vertical by a slant angle between 5 and 20 degrees.

In another aspect of the invention, roughly described, optical apparatus has a plurality of optical paths through a base material having a plurality of compensation regions formed therein, the compensation regions containing compensation material for compensating a thermal dependency of the base material effective index of refraction, and wherein the compensation regions are disposed consecutively along the optical paths on a pitch that varies linearly from the most upstream one of the compensation regions to the most downstream one of the compensation regions. In an embodiment, wherein a particular one of the optical paths carries optical energy having a particular wavelength through the compensation regions, the pitch variation from the most upstream one of the compensation regions to the most downstream one of the compensation regions is approximately equal to M times the particular wavelength, where M is an integer and is preferably equal to 1.

In another aspect of the invention, roughly described, optical apparatus has an arrayed waveguide grating device having an output port in optical communication with an input port via an arrayed waveguide grating, a waveguide in optical communication with a particular one of the input and output ports, and a temperature compensation member that adjusts the physical position of the waveguide laterally with respect to the arrayed waveguide grating substantially in accordance with the function $$y = \sum_{q=0}^{Q} k_q T^q, Q >= 2,$$

for predetermined values of each of the $k_q$'s and throughout a temperature range of −5 C to +70 C. In an embodiment, in which Q=2, and in which the arrayed waveguide grating device has an index of refraction approximated throughout the temperature by $$n = n_0 + n_1 T + n_2 T^2,$$

$k_1$ may be related to $k_2$ substantially by:

$$\frac{k_1}{k_2} = \frac{n_{1g}}{n_{2g}}.$$

In another aspect of the invention, roughly described, optical apparatus has an arrayed waveguide grating device, including an output port in optical communication with an input port via an arrayed waveguide grating, wherein the apparatus has a plurality of passbands including a subject passband, the subject passband having a center wavelength, and wherein the center wavelength varies by less than 70 pm over temperature range −50 C to +90 C. In an embodiment, the center wavelength varies by no more than 40 pm over temperature range −50 C to +90 C. Alternatively, the center wavelength of the subject passband varies by less than 20 pm over temperature range 0C to +70 C. In an embodiment, the center wavelength varies by no more than 10 pm over temperature range 0C to +70 C.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
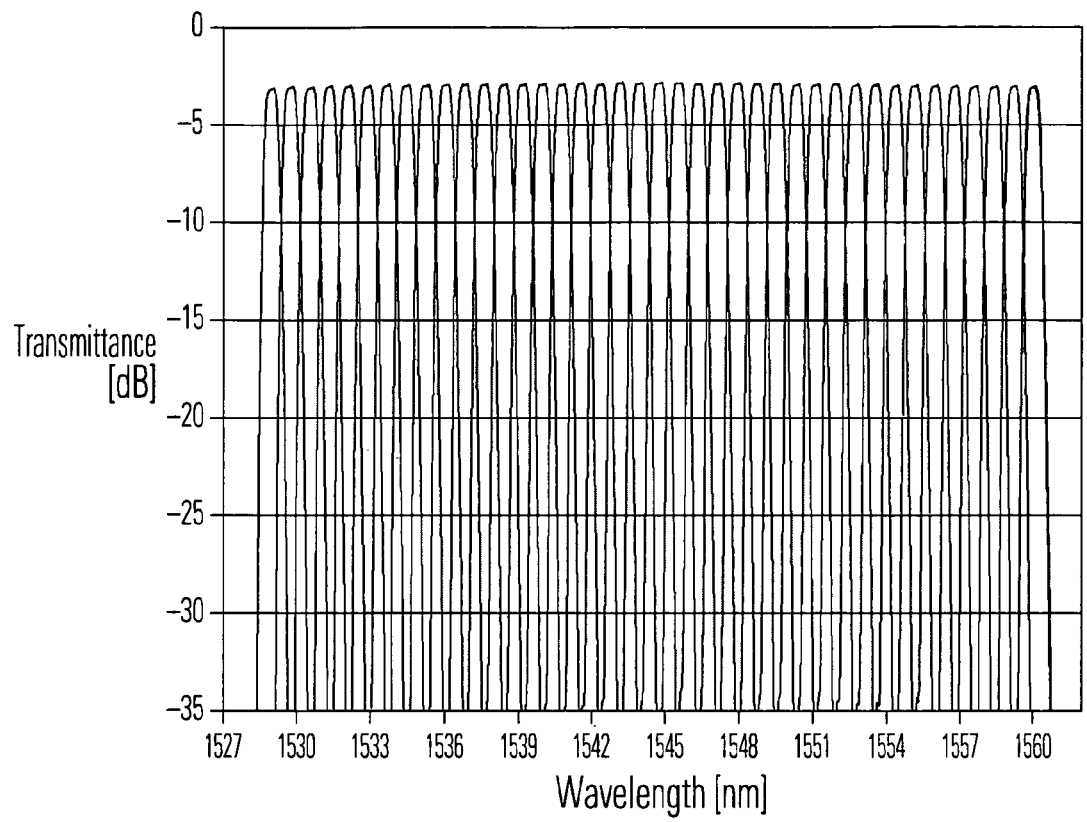
FIG. 1 illustrates the spectral response of a typical AWG acting as a wavelength division demultiplexer.

FIG. 1 illustrates the spectral response of a typical AWG acting as a wavelength division demultiplexer. The plot illustrates the transmittance observed at each of a plurality of different output channels, all superimposed onto a single plot. Alternatively the plot illustrates the spectral response of a typical AWG acting as a wavelength division multiplexer, with the transmittance from each of a plurality of different input channels to a common output superimposed onto a single plot. Each transmittance curve has a main lobe that peaks at about −5 dB, and has a center frequency $f_c$ that varies incrementally from channel to channel, with substantially equal spacing between the center frequencies of adjacent channels. The center frequencies need not be spaced equally in different AWG embodiments. The center wavelength $\lambda_c$ is related to the center frequency as $\lambda_c = c/f_c$, where c is the speed of light. The center wavelength $\lambda_c$ is defined herein as the average of the two wavelengths for which the transmittance is half the peak transmittance for average polarization state.

Figure 2:
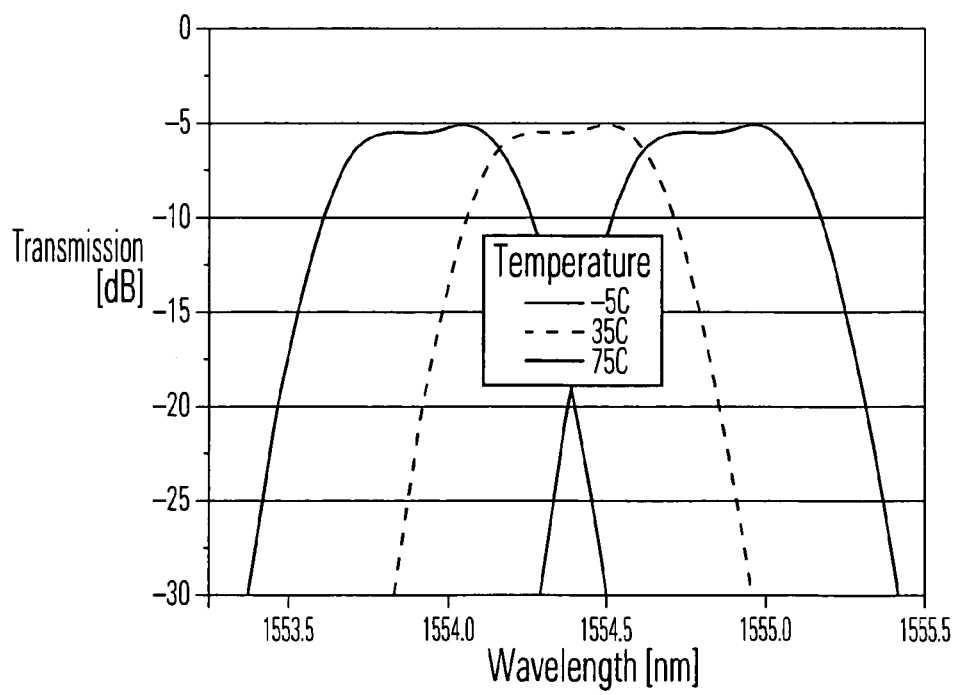
FIG. 2 is a plot showing the transmittance in a single channel of a conventional AWG, at ambient temperatures of −5 C, +35 C and +75 C.

FIG. 2 is a plot showing the transmittance in a single channel of a conventional AWG, at ambient temperatures of −5 C, +35 C and +75 C. It can be seen that the center wavelength increases as the temperature increases. The center wavelength variation with temperature is approximately the same for each channel, so analysis of the center wavelength variation for one channel for most AWG designs is representative of all channels in the design. For purposes of the present discussion, the central channel is used at both the input and output. The center wavelength shift with temperature is problematical in mux/demux applications because the incoming optical energy does not shift. By specification, the incoming optical energy for a given channel has the great majority of its power concentrated within the main lobe of the corresponding AWG passband, so as the passband shifts in wavelength, the channel loss can become substantial. It can be seen that losses may be acceptable within a predetermined temperature range, for example between 0C and 70 C, but unacceptable outside that range. Alternatively it can be seen that the losses may be acceptable above a predetermined channel wavelength spacing (permitting an AWG designed with wider passbands), but unacceptable for narrower channel spacings (requiring an AWG designed with narrower passbands). In filtering applications, a shift in the central wavelength of the passbands can cause the resulting signal to be out of specification and inappropriate for downstream components.

Figure 3:
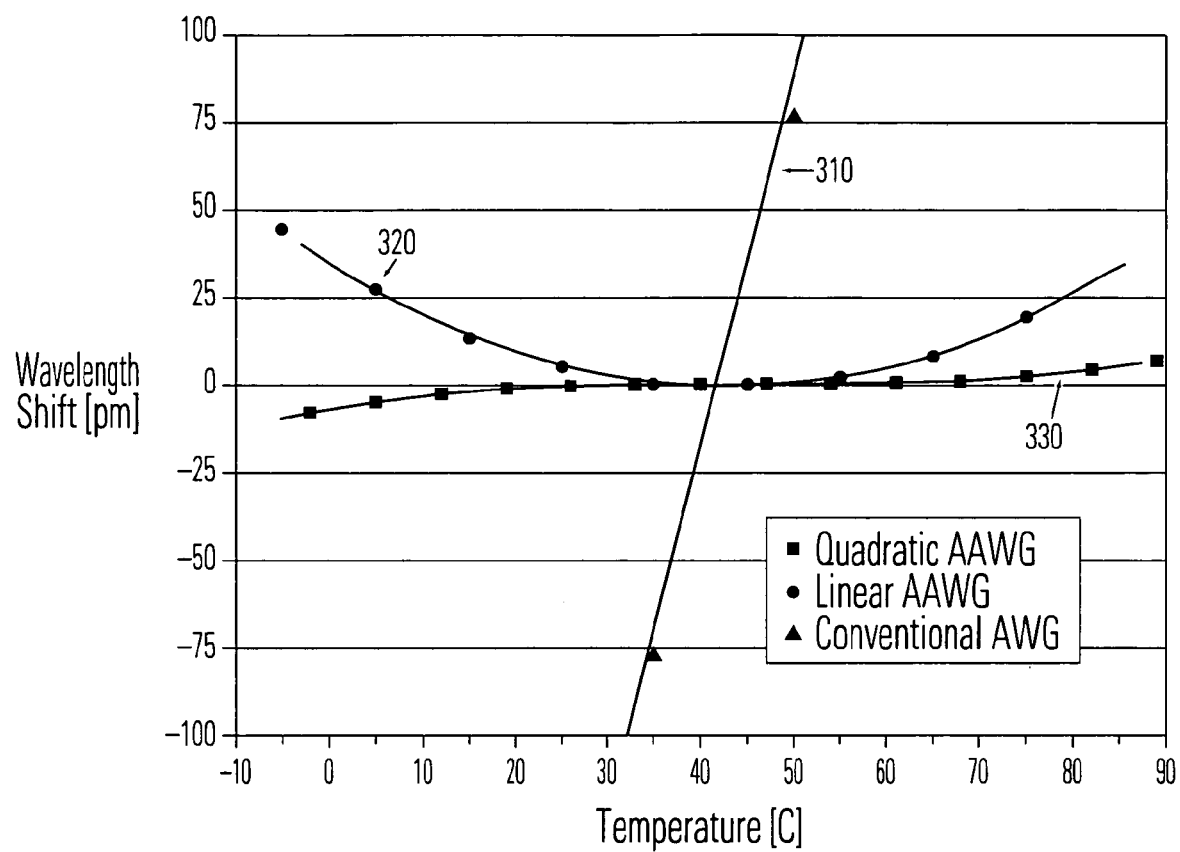
FIG. 3 is a representative plot of center wavelength shift as a function of temperature, for non-athermalized, first order athermalized, and second order athermalized AWGs.

FIG. 3, curve 310, is a representative plot of center wavelength shift as a function of temperature. This plot is for a typical silica AWG having a first order variation with respect to temperature on the order of $9 \times 10^{-6}$. Although the temperature extremes are not visible in FIG. 3, the center wavelength shifts by as much as 0.8 nm over an ambient temperature range of −5 C to +70 C.

For an AWG, the center wavelength $\lambda_c$ is given by $$\lambda_c = \frac{n_{eff} \Delta L}{m}, \quad \text{(eq. 2)}$$

where $n_{eff}$ is the effective refractive index in the waveguide, $\Delta L$ is the length increment between adjacent waveguides in the array, and m is the order of the grating. The temperature dependence of the center wavelength arises because both $n_{eff}$ and $\Delta L$ vary with temperature, although the temperature dependence of $n_{eff}$ is typically much more significant. In fact as explained below the temperature dependence of $\Delta L$ can be lumped into that of $n_{eff}$ without losing much accuracy.

In order to improve the athermal behavior of an AWG, a conventional technique involves substituting a different material in part of the optical path within the AWG. In particular, the conventional technique involves etching slots across the glass and filling them with a polymer. The slots define "regions" of the polymer material, which as used herein refers to the two-dimensional region as viewed from above the waveguide plane. The polymer is usually chosen to have an effective index of refraction that varies with respect to temperature in the opposite direction from that of the glass, although polymers having an effective index of refraction that varies in the same direction as that of the glass can be used instead, if other adjustments are made as described below. The temperature dependencies were modeled only linearly (i.e. to the first order), so the following analysis could be used to select or engineer a target polymer. In particular, in an AWG that has been conventionally athermalized by etching slots across the glass waveguides and filling them with a polymer, the center wavelength is given by $$\lambda_c = \frac{n_g \Delta L_g + n_p \Delta L_p}{m}, \quad \text{(eq. 3)}$$

where $n_g$ and $n_p$ are the effective refractive indices of the glass and polymer respectively, $\Delta L_g$ is the increment between adjacent waveguides in the total physical length of glass segments encountered longitudinally by the optical energy, and $\Delta L_p$ is the increment between adjacent waveguides in the total physical length of polymer segments encountered longitudinally by the optical energy. The parameters $n_g$ and $n_p$ are then modeled as having a linear variation with temperature, that is:

$$n_g = n_{0g} + n_{1g}T \text{ and } n_p = n_{0p} + n_{1p}T, \quad (\text{eq. 4})$$

where $$n_{0x} = n_x\Big|_{T=0} \text{ and } n_{1x} = \frac{dn_x}{dT}\Big|_{T=0}, x = g \text{ and } x = p. \quad (\text{eq. 5})$$

Each material is therefore characterized with two index of refraction terms, a 0'th order term $n_{0x}$ and a first order term $n_{1x}$.

For athermal behavior, $\lambda_c$ is a constant, i.e.

$$\frac{d\lambda_c}{dT} = 0. \quad (\text{eq. 6})$$

So assuming $$\frac{d\Delta L_g}{dT} = \frac{d\Delta L_p}{dT} = 0, \quad (\text{eq. 7})$$

either because the contributions from the $\Delta L$'s are negligible or because their contributions have been lumped into those of the effective indices of refraction, then athermal behavior requires $$\frac{dn_g}{dT}\Delta L_g + \frac{dn_p}{dT}\Delta L_p = 0. \quad (\text{eq. 8})$$

Substituting for $n_g$ and $n_p$ yields $$n_{1g}\Delta L_g + n_{1p}\Delta L_p = 0, \quad (\text{eq. 9})$$

or $$\frac{\Delta L_p}{\Delta L_g} = -\frac{n_{1p}}{n_{1g}}. \quad (\text{eq. 10})$$

Thus if a particular polymer were chosen whose linearized variation with respect to temperature was $n_{1p}$, then the conventional technique would produce a ratio $$\frac{\Delta L_p}{\Delta L_g},$$

the ratio of the total polymer physical length increment between adjacent waveguides in the array to the total glass physical length increment between adjacent waveguides in the array. This ratio could then be used to determine the total required length of polymer in the optical path, which could then be divided up according to other principles into a plurality of polymer-filled slots. An AWG made according to this linearly athermalized technique might exhibit a center wavelength temperature dependency somewhat like curve 320 in FIG. 3. It can be seen that such a device might have better athermal behavior than the version represented by curve 310, but it still varies by about 40 pm over the −5 C to +70 C temperature range.

Note that the linear Taylor expansions of the temperature dependency of $n_g$ and $n_p$ are evaluated at T=0C in (eq.4), but any other evaluation temperature $T_0$ could have been chosen instead. Strictly speaking, such Taylor expansions are valid only at or near a specific temperature. Ideally the values for $n_{0x}$ and $n_{1x}$ would be determined by fitting to a straight line only data that is taken very close to a selected temperature at which optimum temperature stability is desired. Typically this would be either the center of the desired operating temperature range, or possibly the expected most common operating temperature. However, by relying only on data taken very close to a single temperature, the designer may miss large deviations from the linear toward the extremes of the desired operating temperature range. In practice, therefore, a designer may use data taken throughout the desired operating temperature range in order to determine values for $n_{0x}$ and $n_{1x}$. Such a strategy can improve temperature stability of the resulting device toward the extremes of the operating temperature range, but only at the expense of temperature stability at the center of the operating temperature range. Other designers might strike other balances in the tradeoff between stability in the center vs. stability toward the extremes of the operating temperature range.

It can be seen, however, that the need for these strategies arises because the variation of effective index of refraction with respect to temperature for neither polymers nor glass is exactly linear. If these values are modeled quadratically (i.e., if second order terms are taken into account), then:

$$n_g = n_{0g} + n_{1g}T + n_{2g}T^2 \text{ and } n_p = n_{0p} + n_{1p}T + n_{2p}T^2, \quad (\text{eq. 1})$$

where $$n_{0x} = n_x\Big|_{T=0}, \quad (\text{eq. 12})$$

$$n_{1x} = \frac{dn_x}{dT}\Big|_{T=0},$$

$$\text{and } n_{2x} = \frac{d^2n_x}{dT^2}\Big|_{T=0},$$

$$x = g \text{ and } x = p.$$

We can therefore write $$\frac{dn_g}{dT} = n_{1g} + 2Tn_{2g} \quad (\text{eq. 13})$$

and $$\frac{dn_p}{dT} = n_{1p} + 2Tn_{2p}. \quad (\text{eq. 14})$$

Substituting these into (eq.8) for athermal behavior yields $$(n_{1g} + 2Tn_{2g})\Delta L_g + (n_{1p} + 2Tn_{2p})\Delta L_p = 0, \quad (\text{eq.15})$$

or re-arranging and collecting the terms in T, $$2T(\Delta L_g n_{2g}+\Delta L_p n_{2p})+(\Delta L_g n_{1g}+\Delta L_p n_{1p})=0. \quad \text{(eq. 16)}$$

Thus once second order dependencies of the glass and polymer effective indices of refraction are taken into account, it can be seen that true athermal behavior requires not only $$\Delta L_g n_{1g}+\Delta L_p n_{1p}=0, \quad \text{(eq.17)}$$

but also $$\Delta L_g n_{2g}+\Delta L_p n_{2p}=0. \quad \text{(eq.18)}$$

Second Order Polynomials, Single Polymer

Figure 4:
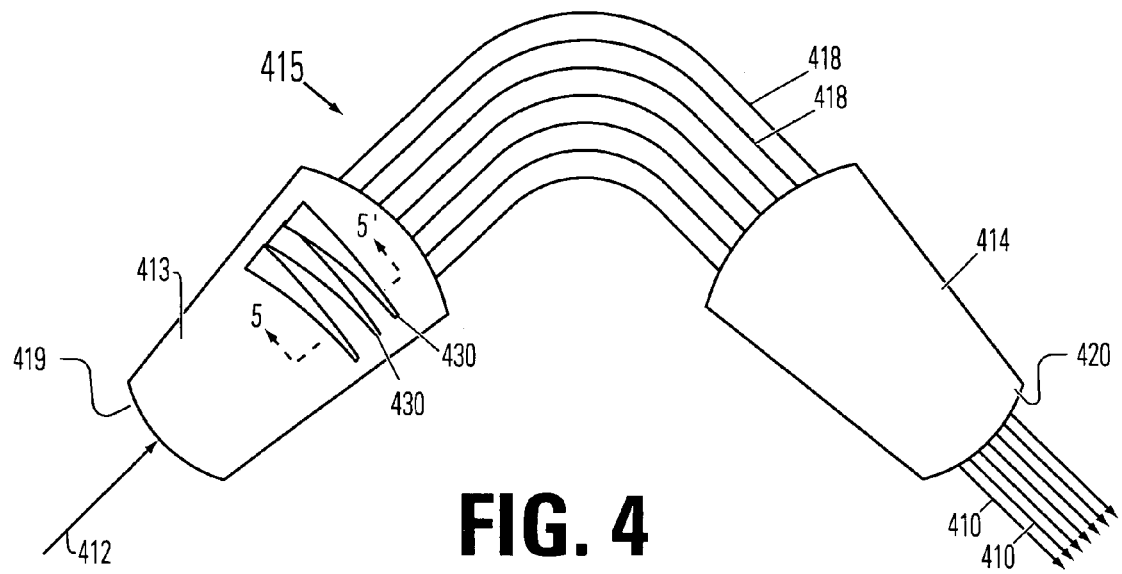
FIGS. 4 and 4A illustrate AWGs incorporating features of the invention.

FIG. 4 illustrates an AWG wavelength division multiplexer/de-multiplexer that has been athermalized by taking second order temperature dependencies into account. It comprises a substrate or "die" (not shown) having provided thereon an arrayed waveguide grating 415 (also called a prism region) consisting of an array of channel waveguides 418, only some of which are shown, which are optically coupled between two planar (slab) waveguide coupling regions 413 and 414. At least input waveguide 412 is optically coupled to an input face 419 of the first slab waveguide 413 for inputting a multiplexed input signal thereto, and a plurality of output waveguides 410 (only some shown) are optically coupled to an output face 420 of the second slab waveguide 414 for outputting respective wavelength channel outputs therefrom to the face of the die. In one embodiment the input and output waveguides 412 and 410 preferably are integrated on the same die as the grating 415 and the two coupling regions 413 and 414, but in another embodiment they can be optical fibers, for example, or lens systems. The geometries of the slab waveguide regions 413 and 414 are both well known, and described for example in U.S. Pat. No. 6,768,842, incorporated by reference herein. The device of FIG. 4 can be operated as a multiplexer rather than a de-multiplexer simply by reversing the optical energy flow direction. Also, in some embodiments, the waveguide 412 in optical communication with the input face 419 of the first slab waveguide 413 is replaced by a plurality of waveguides at different positions along the face 419. Typically a "vernier" calibration procedure is used to identify the single one of these waveguides whose position along the face 419 provides the best performance, and that is the only waveguide that is used in general operation. In such an embodiment, waveguide 412 in FIG. 4 can be thought of as the one waveguide selected from the plurality. In still other embodiments the device operates as a router in which multiple inputs and multiple outputs are in use simultaneously.

In generally known manner, there is a constant predetermined effective optical path length difference between adjacent channel waveguides 418 in the array 415 (typically the physical length of the waveguides increases incrementally by the same amount from one waveguide to the next) which determines the position of the different wavelength output channels on the output face 420 of the second slab coupler 414. As is typical for other AWG's, the physical length of the waveguides in the array increases incrementally by the same amount, $\Delta L_g$, from one waveguide to the next.

Optical energy propagates from the input waveguide 412 to the array waveguides 418 along a plurality of optical paths, each traversing the slab region 413 from the input waveguide to a respective array waveguide 418. In the general case these optical paths are affected by such factors as diffractive, reflective and refractive effects at polymer-glass interfaces which may not lie exactly along the straight line rays. As used herein, therefore, the term "optical path" is intended to include all features affecting the effective optical path length to any significant extent. But in many arrangements the ray-approximation paths are sufficiently accurate for the purposes herein.

Cutting across these paths are a plurality of transversely oriented slots (also called grooves, trenches or more generally, compensation regions) 430 filled with a polymer having an effective index of refraction whose temperature dependence is known to the second order (i.e., $n_{0p}$, $n_{1p}$ and $n_{2p}$ are known). The slots 430 are shaped and sized such that the total physical length increment of polymer through which energy propagates along the optical paths through the slab region 413, $\Delta L_p$, satisfies both (eq. 17) and (eq. 18) above.

Figure 5:
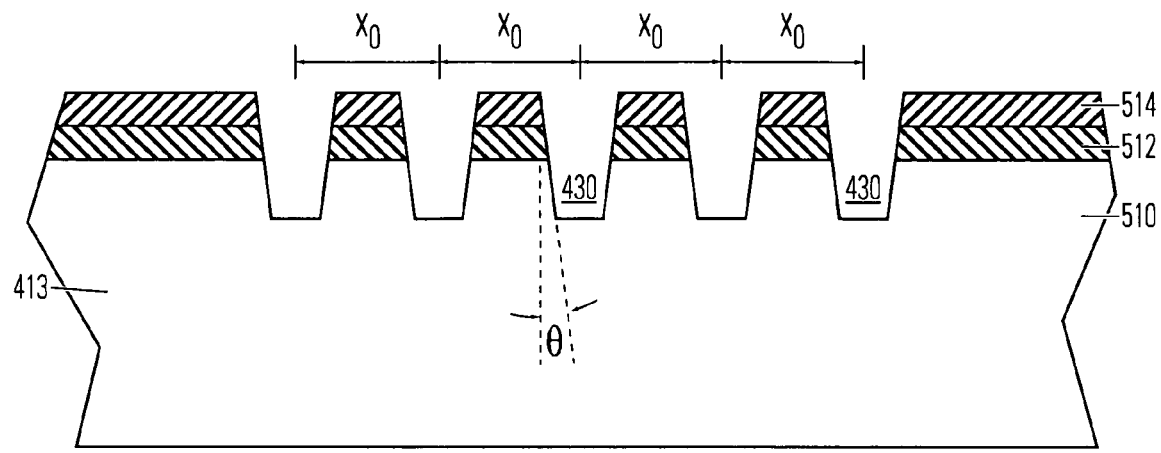
FIGS. 5 and 5A illustrate cross-sectional views in different embodiments, of portions of the slab waveguide region in FIG. 4.

FIG. 5 is a cross-section of a portion of the slab waveguide region 413, taken along sight lines 5-5' in FIG. 4. The slab waveguide includes a substrate 510 acting as the lower cladding layer, a core layer 512 superposing the lower cladding 510 and having an elevated index of refraction, and an upper cladding layer 514 having a lower index of refraction than the core layer 512. As can be seen, slots 430 cut through both the upper cladding 514 and the core layer 512, and into the lower cladding 510. In one embodiment, the leading and trailing edges (the upstream and downstream edges, referenced to the optical energy flow direction) of the slots 430 are slanted by a small angle θ in order to help minimize back-reflectance. Preferably θ is between 5 and 20 degrees, and can be positive or negative. In another embodiment, the leading and trailing edges are substantially vertical (i.e. θ=0).

Figure 5A:
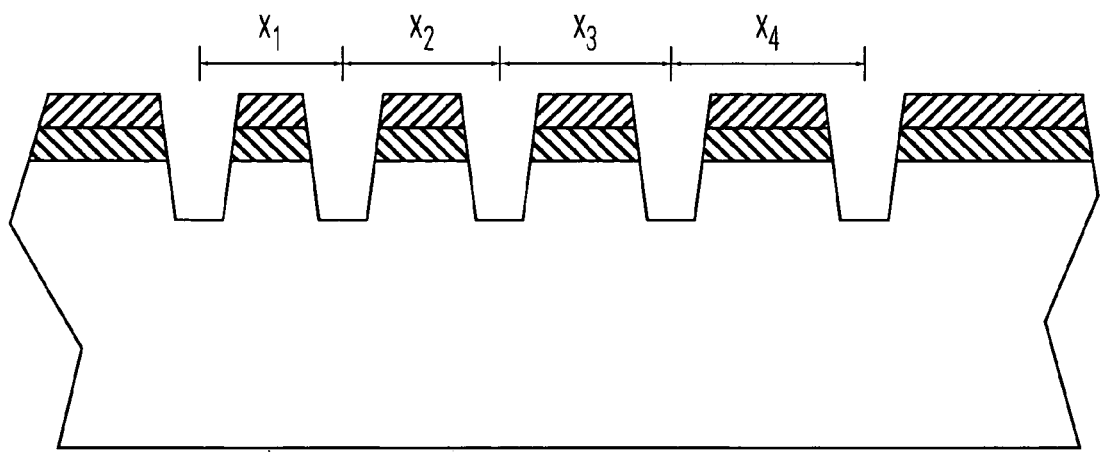

Also as can be seen, all of the slots are disposed at a constant pitch, $x_0$. The pitch $x_0$ is chosen to efficiently recouple losses, and is approximately 55 um. A constant pitch may introduce some reflection grating behavior, however, so in an embodiment, the pitch is varied slightly from $x_0$ between consecutive slots. Reflection grating behavior is highly sensitive to the regularity of the pitch, whereas the recoupling efficiency is not. Therefore a slight deviation from constant pitch can prevent reflection grating behavior without significantly degrading the recoupling effect. In one embodiment the deviation from constant pitch is random. In a more preferred embodiment, as shown in FIG. 5A, the deviation from constant pitch is linear, with the smallest pitch between the two most upstream slots and the largest pitch between the two most downstream slots. The pitch varies by a total of about M times the actual wavelength of the light in the central channel of the AWG through the slot grating, where M is an integer and is preferably equal to 1. The actual wavelength through the slot grating is the wavelength of the central channel in a vacuum, divided by the average index experienced by the light passing through the materials constituting the slot grating.

The structure of FIG. 4 is fabricated using well-known techniques. In known manner, the transmission waveguides and slab waveguides are formed (e.g. using standard photolithographic techniques) as "cores" on a silicon substrate (an oxide layer and/or cladding layer may be provided on the substrate prior to depositing the waveguide cores) and are covered in a cladding material, this being done for example by Flame Hydrolysis Deposition (FHD) or Chemical Vapor Deposition (CVD) fabrication processes. The slots 430 are then etched photolithographically, and the polymer compensation material is applied using a volumetrically controlled syringe dispenser and then cured, either thermally or using actinic radiation depending on the choice of polymer. Alternatively a material can be deposited into slots 430 by sputtering or any other method.

Note that in other embodiments, not all the polymer-filled slots need to be located in the first slab waveguide region. In another embodiment they are located in the waveguide array region 415, or in the second slab region 414, or in a region that straddles the boundary between the waveguide array 415 and one of the slabs 413 or 414. In yet another embodiment, they are divided up among all these regions in any desired combination.

Figure 4A:
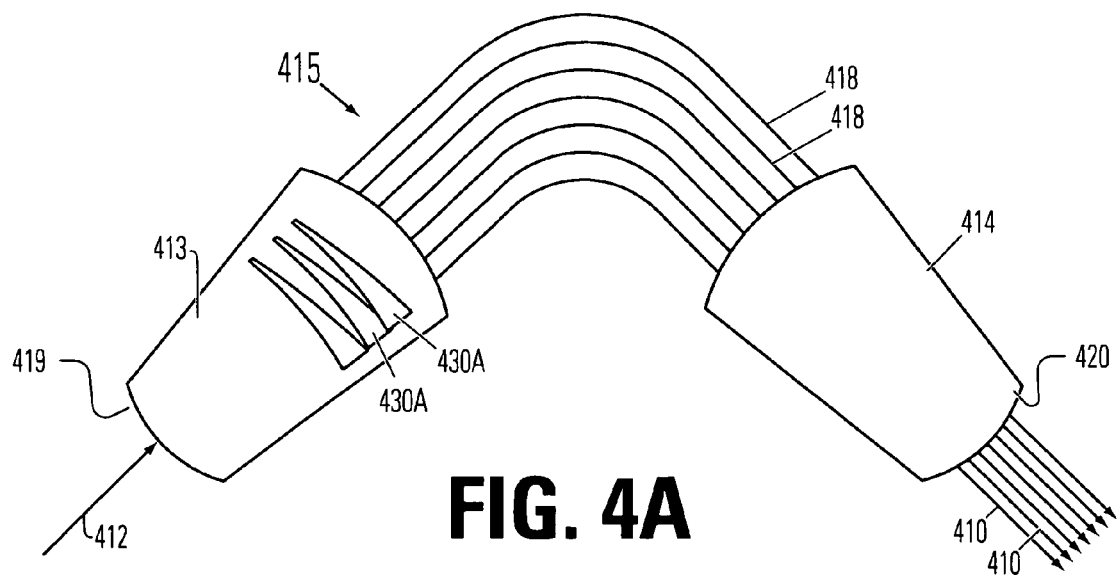

The description above regarding FIGS. 4, 5 and 5A assume that the slot fill material is a polymer and the non-slotted segments of the optical paths are silica. In other embodiments, different combinations of materials may be used. For example, since the index of refraction of most polymers and the index of refraction of silica tend to vary with temperature in opposite directions, FIG. 4 is drawn showing slots that are wider at the top end than at the bottom end of the slot. That is, the polymer fill occupies a longer segment of optical paths that have longer silica segments, than it occupies of optical paths that have shorter silica segments. This is appropriate in order to satisfy (eq. 17). According to that equation, if $n_{1g}$ and $n_{1p}$ are of opposite signs, the equation can be satisfied only if the physical length increment of polymer filled segments in adjacent optical paths is of the same sign as the physical length increment of silica segments in adjacent optical paths—i.e., only if the slots lengthen as one proceeds across the array 415 toward longer waveguides 418. In another embodiment, as shown in FIG. 4A, the slots can be filled with a material whose index of refraction variation with temperature is of the same sign as that of the base material. In this case the slots 430A are wider at the bottom than at the top, since (eq. 17) calls for the physical length increment in the compensation material from one optical path to the next, and the physical length increment in the base material from one optical path to the next, to have opposite signs. Many other variations will be apparent, and some of them are discussed further hereinafter.

The second order athermalization technique requires knowledge of both the first and second order terms for the temperature dependence of the effective indices of refraction of both the glass and the polymer materials. These are not believed to be generally available in the literature. However, they can be determined experimentally by measuring the effective indices of refraction of the materials at a number of different temperatures and fitting the data to a quadratic equation using well-known curve-fitting techniques. At least three data points are required to fit a quadratic equation, but preferably many more than three are used to develop the most stable resulting device.

Higher Order Polynomials Single Polymer

The above technique can be extended to take into account higher order temperature dependencies of the effective indices of refraction, up to any order Q. To do so, the above equations can be generalized by defining $$n_g = \sum_{q=0}^{Q} n_{qg} T^q \text{ and } n_p = \sum_{q=0}^{Q} n_{qp} T^q, \qquad (eq.\ 19)$$

where $$n_{qx} = \left.\frac{d^q n_x}{dT^q}\right|_{T=0}, x = g \text{ and } x = p. \qquad (eq.\ 20)$$

We can therefore write $$\frac{dn_x}{dT} = \sum_{q=1}^{Q} q n_{qx} T^{(q-1)}, x = g \text{ and } x = p. \qquad (eq.\ 21)$$

Substituting into (eq. 8) for athermal behavior yields $$\Delta L_g \sum_{q=1}^{Q} q n_{qg} T^{(q-1)} + \Delta L_p \sum_{q=1}^{Q} q n_{qp} T^{(q-1)} = 0. \qquad (eq.\ 22)$$

Rearranging and collecting terms in like orders of T, gives $$\sum_{q=1}^{Q} q(\Delta L_g n_{qg} + \Delta L_p n_{qp}) T^{(q-1)} = 0. \qquad (eq.\ 23)$$

This equation is satisfied if $\Delta L_g n_{qg} + \Delta L_p n_{qp} = 0$ for all q between 1 and Q, inclusive. (eq.24)

Accordingly, in another embodiment, an AWG is constructed in the same manner as shown in FIG. 4, but the polymer, the glass and the ΔL's are chosen to satisfy all Q of the requirements of (eq.24).

Including Mechanical Temperature Dependencies

The above techniques can be further extended to take into account the temperature dependencies not only of the effective indices of refraction, but also the ΔL's. In this case athermal behavior requires $$\frac{dn_g}{dT}\Delta L_g + \frac{dn_p}{dT}\Delta L_p + n_g \alpha \Delta L_g T + n_p \alpha \Delta L_p T = 0, \qquad (eq.\ 25)$$

with α being the mechanical thermal expansion coefficient of the chip. However, since $\Delta L_p$ is much smaller than $\Delta L_g$ in a typical embodiment, the mechanical expansion term can be lumped into $n_{1g}$ without much loss of accuracy. Furthermore, if $n_{1g}$ is determined empirically rather than being obtained from the literature, then the value determined for $n_{1g}$ will inherently include contributions from the mechanical expansion term. Preferably the empirical determination is made using data taken from a chip already packaged in the same manner as would the final product, so that if the packaging of the final product will influence the mechanical expansion exhibited by the chip, those influences are present also in the chip as tested. Alternatively the empirical determination can be made using data taken from an unpackaged chip, and a compliant layer separates the chip from the packaging in the final product.

Additional accuracy can be obtained by lumping the mechanical expansion term in appropriate proportions into both the first and second order index terms as follows:

$$n_{1g} = n'_{1g} + n_{0g}\alpha$$

$$n_{2g} = n'_{2g} + n_{1g}\alpha$$

$$n_{1p} = n'_{1p} + n_{0p}\alpha$$

$$n_{2p} = n'_{2p} + n_{1p}\alpha$$

This is easily generalized to higher order polynomial models and to more than one polymer, which are discussed elsewhere herein.

Second Order Polynomials, Two Polymers

Returning to the quadratic athermalization embodiment, it may be difficult to identify a polymer that satisfies both equations (eq. 17) and (eq. 18), and also satisfies all other requirements of commercial manufacturability, such as low insertion loss, humidity tolerance, photostability, and long term reliability. While the literature reports the temperature dependency of the refractive index of certain polymers in their quasi-linear regions above and below the glass transition temperature, and while mechanisms are known for engineering a polymer with a desired first order temperature dependency term, literature rarely reports second order or nonlinear dependency terms for these polymers.

In an aspect of the invention, two different polymers are used in tandem to athermalize the combined effective index of refraction. Denoting the two polymers by subscripts 'A' and 'B', (eq.3) and (eq.8) above can be re-written as $$\lambda_c = \frac{n_g \Delta L_g + n_A \Delta L_A + n_B \Delta L_B}{m} \quad \text{(eq. 26)}$$

$$\frac{dn_g}{dT}\Delta L_g + \frac{dn_A}{dT}\Delta L_A + \frac{dn_B}{dT}\Delta L_B = 0 \quad \text{(eq. 27)}$$

Substituting as before gives $$(n_{1g}+2Tn_{2g})\Delta L_g + (n_{1A}+2Tn_{2A})\Delta L_A + (n_{1B}2Tn_{2B})\Delta L_B = 0,$$

and re-arranging and collecting the terms in T, $$2T(\Delta L_g n_{2g} + \Delta L_A n_{2A} + \Delta L_B n_{2B}) + (\Delta L_g n_{1g} + \Delta L_A n_{1A} \Delta L_B n_B) = 0.$$

So for temperature independence using two polymers and taking into account the second order dependencies of the effective indices of refraction of the three materials (the glass and polymers A and B), it is sufficient that the glass, the polymers and the $\Delta L$'s be chosen such that:

$$\Delta L_g n_{1g} + \Delta L_A n_{1A} + \Delta L_B n_{1B} = 0, \quad \text{(eq.28)}$$

and $$\Delta L_g n_{2g} + \Delta L_A n_{2A} + \Delta L_B n_{2B} = 0. \quad \text{(eq.29)}$$

The values of $n_1$ and $n_2$ for the glass and the two polymers can be determined experimentally as previously described, so it remains only to determine appropriate physical length increments. Equations (eq.28) and (eq.29) provide only two equations for interrelating the three unknown lengths $\Delta L_g$, $\Delta L_A$ and $\Delta L_B$, so only relative lengths are derived as follows:

$$\frac{\Delta L_A}{\Delta L_B} = -\frac{\left(\frac{n_{1B} \cdot n_{2g}}{n_{1g}} - n_{2B}\right)}{\left(\frac{n_{1A} \cdot n_{2g}}{n_{1g}} - n_{2A}\right)} \quad \text{(eq. 30)}$$

and $$\Delta L_g = -\Delta L_A \cdot \frac{(n_{1A})}{(n_{1g})} - \Delta L_B \cdot \frac{(n_{1B})}{(n_{1g})}. \quad \text{(eq. 31)}$$

Together with (eq.26) (at T=0), which constrains the three $\Delta L$'s in order to yield a desired center wavelength, three equations interrelate the three $\Delta L$'s. In matrix form, the three equations can be expressed as:

$$\begin{pmatrix} n_{0g} & n_{0A} & n_{0B} \\ n_{1g} & n_{1A} & n_{1B} \\ n_{2g} & n_{2A} & n_{2B} \end{pmatrix} \begin{pmatrix} \Delta L_g \\ \Delta L_A \\ \Delta L_B \end{pmatrix} = \begin{pmatrix} m\lambda_c \\ 0 \\ 0 \end{pmatrix}. \quad \text{(eq. 32)}$$

Accordingly, the three $\Delta L$'s can now be calculated uniquely as:

$$\begin{pmatrix} \Delta L_g \\ \Delta L_A \\ \Delta L_B \end{pmatrix} = \begin{pmatrix} n_{0g} & n_{0A} & n_{0B} \\ n_{1g} & n_{1A} & n_{1B} \\ n_{2g} & n_{2A} & n_{2B} \end{pmatrix}^{-1} \begin{pmatrix} m\lambda_c \\ 0 \\ 0 \end{pmatrix}. \quad \text{(eq. 33)}$$

An AWG embodiment incorporating two polymers has the same structure as that of FIGS. 4 and 5, but some of the slots 430 are filled with polymer A and the remainder are filled with polymer B. In an embodiment, polysiloxanes (Silocane elastomers) are used for both polymer A and B. Polysiloxane A is engineered to match the index of refraction of the glass, and polysiloxane B is engineered to have a glass transition temperature higher than for polymer A. The polymer A slots can all be grouped together in one embodiment, but in another embodiment they are interspersed among the polymer B slots. The different slots are allocated to one polymer or the other such that as one moves laterally across the optical paths, from paths having shorter waveguides 418 toward paths having longer waveguides 418, the total physical path length of polymer A encountered by the optical energy increases incrementally from each path to the next adjacent path by $\Delta L_A$, the total physical path length of polymer B encountered by the optical energy increases incrementally from each path to the next adjacent path by $\Delta L_B$, and the total physical path length of non-slotted segments encountered by the optical energy increases incrementally from each path to the next adjacent path by $\Delta L_g$, where $\Delta L_A$, $\Delta L_B$, and $\Delta L_g$ are given by (eq.33) above.

As an example, assume it is desired to quadratically athermalize the AWG whose center wavelength temperature dependency is as shown in curve 310 in FIG. 3. Assume this AWG is primarily silica, and the refractive index of the silica material is measured at a number of temperatures throughout and beyond a desired operating temperature range of −30 C to +70 C. The data are then fit to a quadratic function in T, and it is found that the zero'th, first and second order coefficients are as follows:

| | |
|---|---|
| $n_{0g}$ | 1.4529 |
| $n_{1g}$ | 9.1e−6 |
| $n_{2g}$ | 1.36e−8 |

Figure 6:
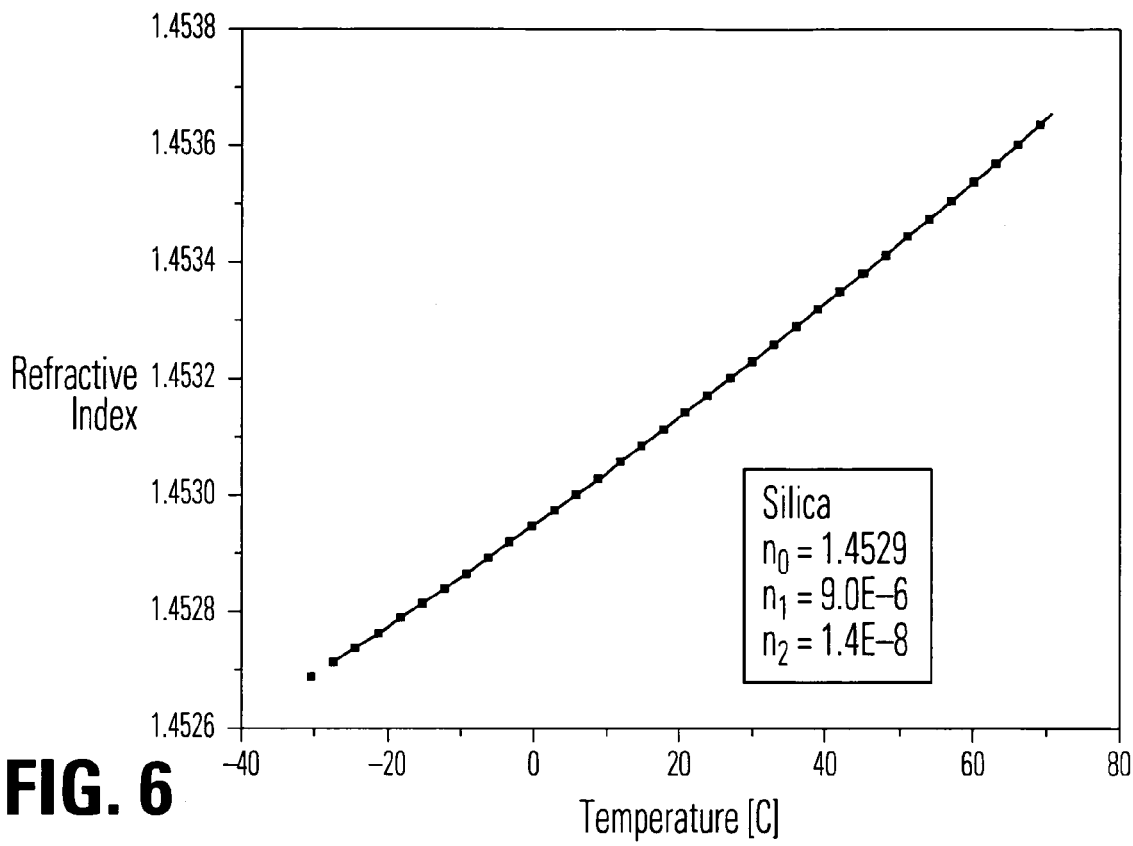
FIGS. 6, 7 and 8 are plots of refractive index vs. temperature for three different materials.

FIG. 6 is a plot of the experimental data with the second order polynomial function defined by the above coefficients drawn in. It can be seen that the fit to a second order polynomial seems very good, much better than would a straight line fit to the same data. It can be seen also that the index varies positively with temperature ($n_{1g}>0$), and that the curve is slightly concave when viewed from above ($n_{2g}>0$).

In order to athermalize this AWG, two polymers are chosen, polymer A and polymer B. The refractive index of polymer A is measured at a number of temperatures throughout and beyond a desired operating temperature range of −30 C to +70 C, and the data are fit to another quadratic function in T. It is found that the zero'th, first and second order coefficients are as follows:

| | |
|---|---|
| $n_{0A}$ | 1.4797 |
| $n_{1A}$ | −3.04e−4 |
| $n_{2A}$ | 1.36e−7 |

Figure 7:
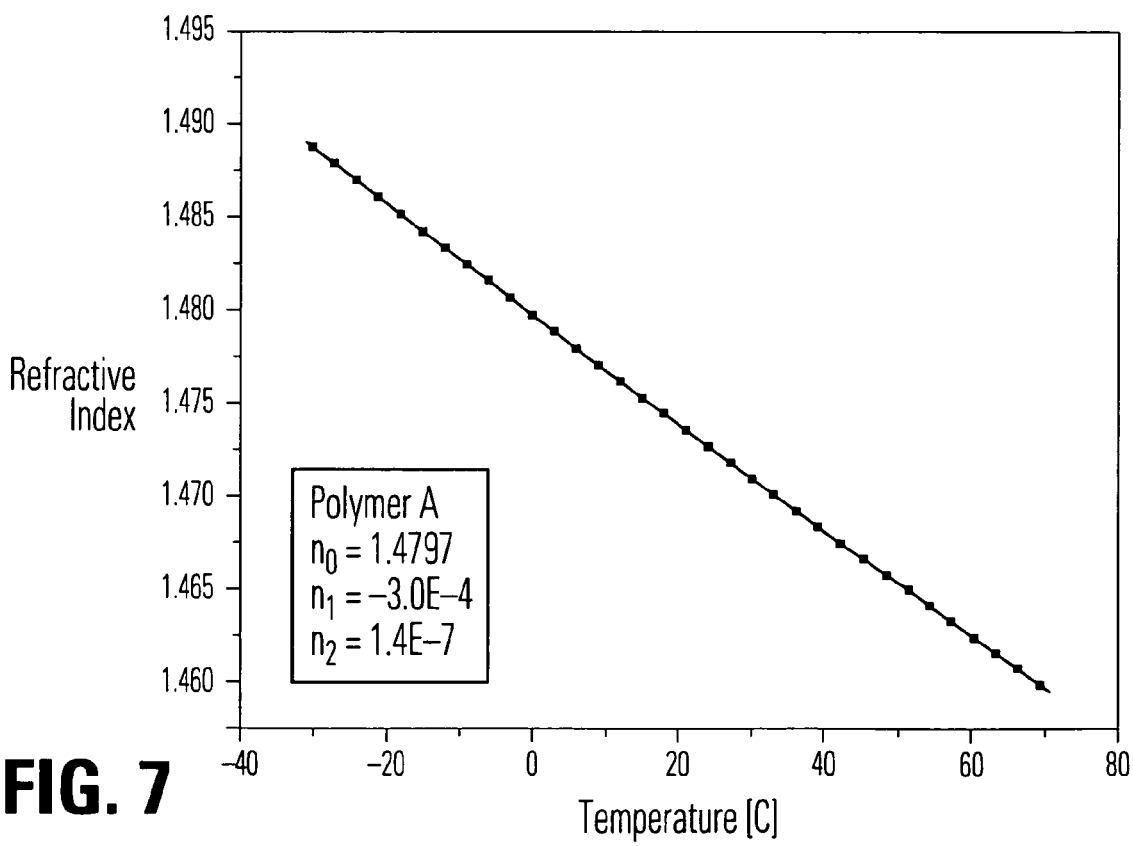

FIG. 7 is a plot of the polymer A experimental data with the second order polynomial function defined by the above coefficients drawn in. It can be seen also that the index for this polymer A varies negatively with temperature ($n_{1A}<0$), and that the curve is slightly concave when viewed from above.

Similarly, the refractive index of polymer B is measured at a number of temperatures throughout and beyond a desired operating temperature range of −30 C to +70 C, and the data are fit to yet another quadratic function in T. It is found that the zero'th, first and second order coefficients are as follows:

| | |
|---|---|
| $n_{0B}$ | 1.5095 |
| $n_{1B}$ | −1.63e−4 |
| $n_{2B}$ | −7.96e−7 |

Figure 8:
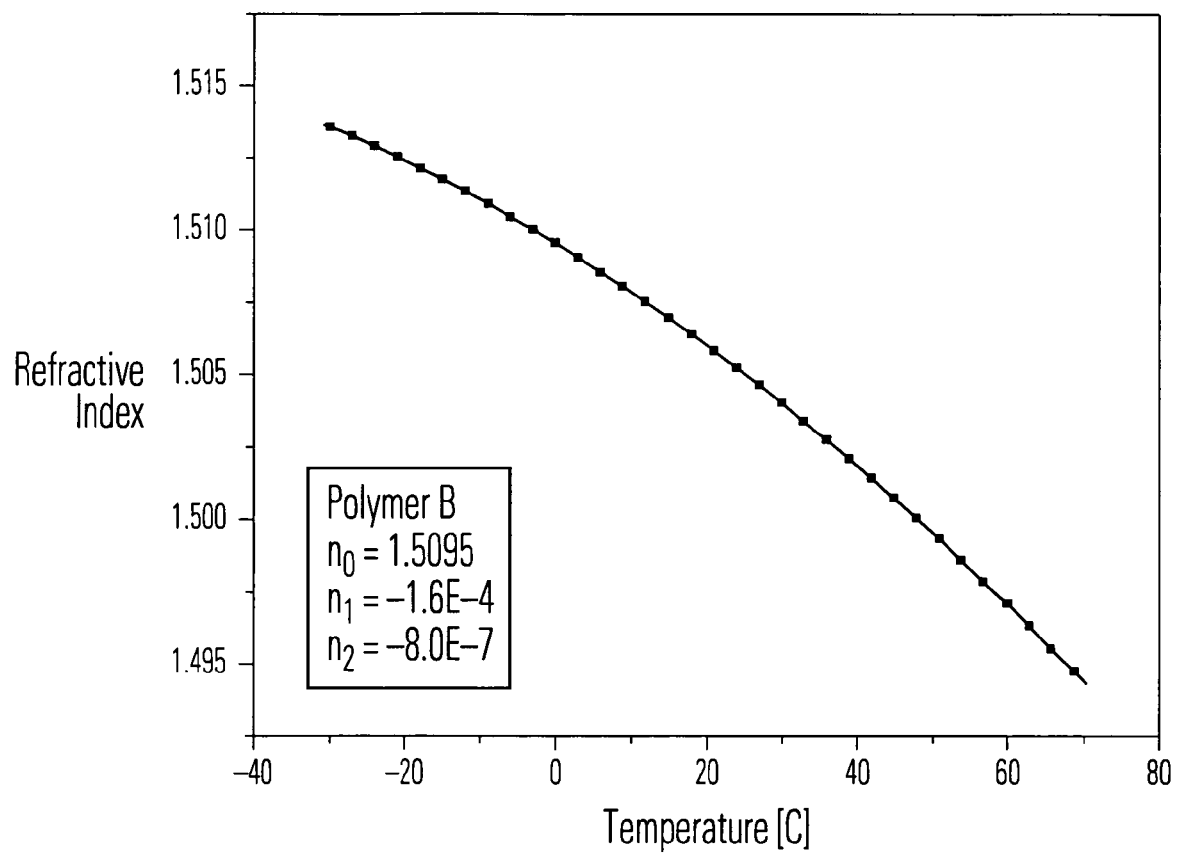

FIG. 8 is a plot of the polymer B experimental data with the second order polynomial function defined by the above coefficients drawn in. It can be seen also that the index for this polymer B also varies negatively with temperature ($n_{1B}<0$), and that the curve is slightly convex when viewed from above.

It might be intuited from the curves of FIGS. 7 and 8 that the two polymers might counter the linear term of the silica temperature dependency of FIG. 6, if present for a sufficient percentage of the optical paths, since the plots in FIGS. 7 and 8 slope in a direction opposite that of FIG. 6. It might also be intuited from the concavities/convexities of the curves of FIGS. 7 and 8 that the two polymers might also have a flattening effect on the temperature dependency of the silica, again if present in appropriate ratios. In fact this is true. Using the first and second order coefficients determined above for the silica and the two polymer materials, and using (eq.33) above, the ΔL's are calculated as follows:

| | |
|---|---|
| $\Delta L_g$ | 33.8 um |
| $\Delta L_A$ | 0.62 um |
| $\Delta L_B$ | 0.66 um |

An AWG produced using the above three materials and in accordance with the above ΔL's exhibits a center wavelength temperature dependency as shown in curve 330 of FIG. 3. It can be seen that this device exhibits a center wavelength shift as a function of temperature ranging no more than about 5 pm over an enlarged temperature range of −30 C to +70 C, an enormous improvement over conventional linearly athermalized devices. Thus it can be seen that an AWG using two polymers and characterized to the second order as described herein, can achieve either a much larger temperature range, or much more densely packed channels, or both, than can a conventional device.

The ratio of $\Delta L_A$ to $\Delta L_B$ is given by (eq.30). If the slots are shaped and sized so that along each given optical path, all the slots present the same polymer propagation distance in the given optical path, then the ratio of distances $\Delta L_A/\Delta L_B$ in (eq.30) reduces to simply a ratio of the number of slots to fill with polymer A to the number of slots to fill with polymer B. In the above example, the desired ratio of $\Delta L_A$ to $\Delta L_B$ can be achieved approximately using 23 slots filled with polymer A and 25 slots filled with polymer B.

Polynomials of Arbitrary Order, Arbitrary Numbers of Materials

The above analysis can be extended to any order Q of modeling polynomial, and to material systems having any number X of different materials. This can be accomplished by writing for each material x:

$$n_x = \sum_{q=0}^{Q} n_{q,x} T^q, \qquad (eq.\ 34)$$

where $$n_{q,x} = \left.\frac{d^q n_x}{dT}\right|_{T=0}, \qquad (eq.\ 35)$$

and re-writing the center wavelength equation as $$m\lambda_c = n_0 \Delta L_0 + n_1 \Delta L_1 + \ldots + n_{X-1} \Delta L_{X-1}, \qquad (eq.36)$$

(where in this equation the subscript on the n's and ΔL's represent the material number). The athermality equation can then be re-written in matrix form as $$N \cdot \Delta L = 0, \qquad (eq.\ 37)$$

where $$N = \begin{pmatrix} n_{1,0} & n_{1,1} & \ldots & n_{1,X-1} \\ n_{2,0} & n_{2,1} & \ldots & n_{2,X-1} \\ \vdots & \vdots & & \vdots \\ n_{Q,0} & n_{Q,1} & \ldots & n_{Q,X-1} \end{pmatrix}, \qquad (eq.\ 38)$$

-continued $$\Delta L = \begin{pmatrix} \Delta L_0 \\ \Delta L_1 \\ \vdots \\ \Delta L_{X-1} \end{pmatrix}, \quad \text{(eq. 39)}$$

and $\Delta L_X$ is the total physical path length increment of material x between adjacent optical paths. In these discussions, one of the X materials is a "base" material, in which the bulk of the device is constructed, and in which the compensation regions are formed. The remaining X−1 materials are sometimes referred to herein as "compensation materials" because they compensate for the athermality of the base material. In the embodiments described above, the base material is a silica and the compensation materials are all polymers. Since this need not be the case in other embodiments, no distinction is made here between polymer materials and glass materials.

Equation (eq.36) in combination with (eq.37) make a system of Q+1 equations in X unknowns, which has a unique solution when the number of materials X in the system is one greater than the highest order term Q of the polynomials used to model the materials. Therefore if it is desired to model the materials using polynomials of order Q, then values for the $\Delta L$'s can be calculated uniquely if Q+1 different materials are used in the material system.

If X=Q materials are used in the material system, then (eq.37) has a solution only if det(N)=0 (i.e. one of the rows of the matrix N in (eq.38) is a linear combination of the other rows). For example, for second order modeling (Q=2) of the index of refraction temperature dependencies, using only two materials (X=2) (e.g. one silica and one polymer), (eq.37) requires:

$$\frac{n_{1p}}{n_{2p}} = \frac{n_{1g}}{n_{2g}}. \quad \text{(eq. 40)}$$

Depending on the values of these parameters, it may be possible to engineer a polymer that satisfies (eq.40) in order to create a single-polymer AWG having a substantially flat (to the second order) relationship of central wavelength to temperature.

If X<Q materials are used in the material system, then (eq.37) requires that all the rows in the matrix N in (eq.38) having a first subscript larger than q=X−1 be a linear combination of the first X−1 rows. This places additional restrictions on the relationship among the coefficients.

In both cases (X=Q and X<Q), therefore, the athermality equation specifies interrelationships among the coefficients of the Taylor expansion of the index of refraction temperature dependencies of the various materials, in addition to specifying interrelationships among the physical path length increments for the different materials. While not necessarily precluding a solution, the additional specifications can significantly complicate the identification of satisfactory materials.

Nevertheless, even if materials are not found which satisfy the Taylor expansion coefficient relationships, it is still possible to improve the athermality of the resulting device significantly by choosing the $\Delta L$'s so as to optimize the center wavelength error over the temperature range of interest. A numerical error minimization analysis, which finds the vector $\Delta L = (\Delta L_0, \Delta L_1, \ldots, \Delta L_{X-1})^T$ which minimizes the variation in $\lambda_c$ in (eq.36) over the temperature range of interest, might be used for this purpose. Many variations on this theme are possible as well, such as weighting the experimental data to give greater influence to one segment of the overall temperature range of interest.

If more than Q+1 materials are available for use (i.e. X>Q+1), then multiple solutions are possible and one of them may be selected based on other criteria.

It will be appreciated that the above (eq.36) for the center wavelength and (eq.37) for athermal behavior state in more general form all the other equations above for specific numbers of materials and for specific orders of polynomial index modeling. As used herein, whenever an equation herein generalizes a particular numerical parameter, the equation is intended to represent an affirmative teaching of the equation for every value of the parameter. For example, since (eqs.36 and 37) generalize the parameters Q and X, these equations are intended to represent affirmative teachings of the equation for every combination of values for Q and X.

Non-Polynomial Function Type Modeling

In most of the description above, it is assumed that the function types used to model the non-linear index of refraction temperature dependency of different materials, are polynomials. It may happen, however, that one or more of the materials either cannot be described easily by a polynomial, or may require very large order polynomials to model with sufficient accuracy, or simply may require a higher order polynomial than the number of available compensation materials (X<Q+1). These situations may arise, for example, for polymers exhibiting a relatively abrupt index of refraction change around a temperature within the desired operating temperature range. Polymers having a glass transition temperature within the desired operating temperature range can often exhibit such an abrupt change and might benefit from being modeled by a non-polynomial function type. In these situations it may still be beneficial to use a three (or more)-material system in order to minimize the wavelength error across the temperature range.

At least two methodologies are available to accomplish this. First, if the empirically-obtained refractive index temperature dependency data for one or more of the materials fit well to one or more non-polynomial function types, then it still may be possible to solve for the $\Delta L$'s in closed form by substituting the non-polynomial function types into the appropriate athermalization equation (eq.8, 23, 27 or 37). If the function types preclude an algebraic closed-form solution, or in the absence of predetermined function types for the refractive index temperature dependency of one or more of the materials, then conventional numerical optimization programs can be used to find numerical solutions for the $\Delta L$'s that optimize athermalization. In either case, it is still possible to obtain substantial improvement in athermality over a broader temperature range either by the use of non-linear function types for modeling the refractive index temperature dependency of one or more of the materials, or by using at least three materials, or both.

Slot Shape and Size Considerations

The slots 430 as shown in FIG. 4 are all shown as curved triangles that are narrower (occupy a shorter longitudinal segment of the optical paths) near the bottom of the illustration and wider (occupy a longer longitudinal segment of the optical paths) near the top of the illustration. Many variations on this shape are possible. One variation has already been discussed, namely that the slots can be flipped, putting the narrower end of the triangles toward the top of the illustration and the wider ends near the bottom, in the case of a compensation material whose index varies with temperature in the same direction as that of the base material. In a further variation, in an embodiment using two different compensation materials whose indices vary with temperature in opposite directions with respect to each other, the slots allocated to the first compensation material may be oriented as shown in FIG. 4 while the slots allocated to the second compensation material may be flipped. The slot orientation for a particular material (aggregate of all slots along an optical path) depends on the sign of the $\Delta L$ for the particular material: since $\Delta L$ represents the physical path length increment as one progresses from bottom to top in the AWG of FIG. 4, a negative $\Delta L$ for a particular material calls for the slots to be oriented so as to be wider near the bottom than near the top.

At least two principles guide the numerous variations that are possible: first, in aggregate through all the materials interposed in the optical paths, the increment between adjacent optical paths in the length of each material encountered longitudinally along an optical path should substantially equal the $\Delta L$ calculated above for that material; and second, the upstream and downstream edges of the slots should be shaped and oriented to minimize refractive, reflective and diffractive effects on the optical energy. The former principle can be satisfied by forming a single triangular slot for each material. Assuming the compensation material does not provide planar waveguiding as does the remainder of the slab region 413, however, a single slot may allow too much light to escape the waveguide vertically. By dividing the triangle into multiple slots, each slot can be narrower. More importantly, when the distance between the multiple slots is chosen properly, some of the loss, which arises due to the diffraction in the slot, is constructively recoupled as guided light in the waveguide downstream of the subsequent slot.

Figure 9A:
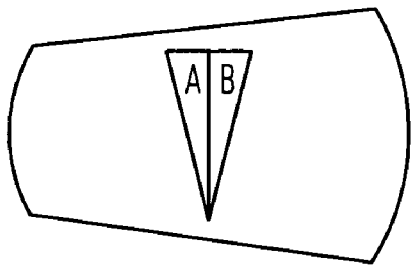
FIGS. 9A-9F and 10A-10D illustrate various arrangements of compensation regions in the input coupling region of the AWG of FIG. 4.
Figure 9D:
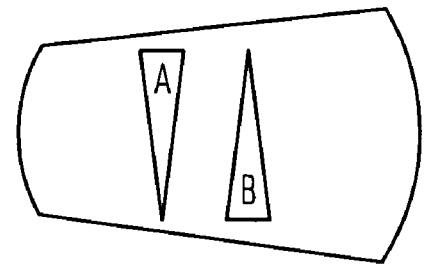
Figure 9B:
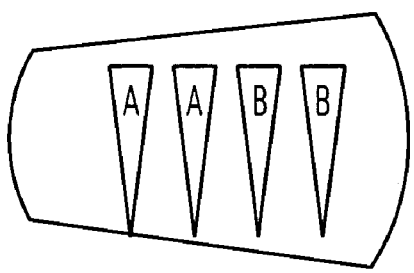
Figure 9E:
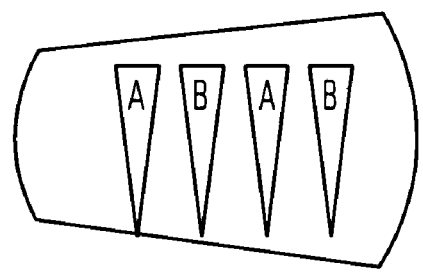
Figure 9C:
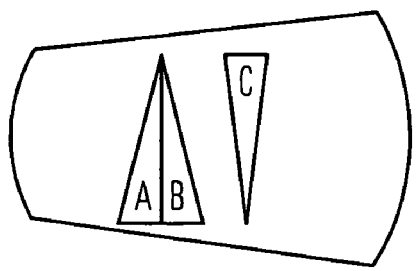
Figure 9F:
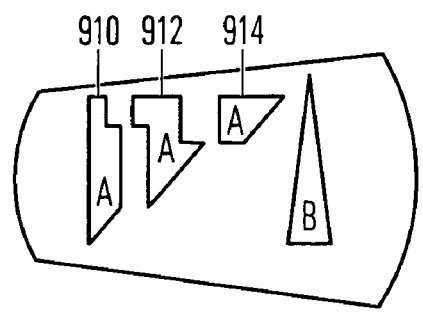

FIGS. 9A-9F illustrate a number of different slot configurations that can be used in various embodiments. In FIG. 9A, polymers A and B are deposited side-by-side within a single triangularly-shaped slot. In FIG. 9B, two slots are allotted to each of polymers A and B. The slots are arranged so that the incoming optical energy traverses all of the polymer A slots before reaching any of the polymer B slots. In FIG. 9C, polymers A and B are deposited side-by-side within a single triangularly-shaped slot, and a third polymer, polymer C, is deposited in a separate slot. The polymer A/B triangle and the polymer C triangle are oppositely oriented. In FIG. 9D, polymers A and B are deposited in two separate triangular slots of opposite orientation. In FIG. 9E, two slots are allotted to each of polymers A and B, with the polymer B slots interspersed among the polymer A slots. FIG. 9F emphasizes the freedom to choose widely varied shapes for filling with a particular material as long as the physical path length increment $\Delta L$ determined for the particular material is satisfied in the aggregate through all regions of the material. In this figure an overall triangle of polymer A is fragmented into three separate regions 910, 912 and 914 at arbitrary fragmentation boundaries; but the aggregate of the three regions still satisfies the physical path length increment $\Delta L_A$. Numerous other variations are possible.

Figure 10:
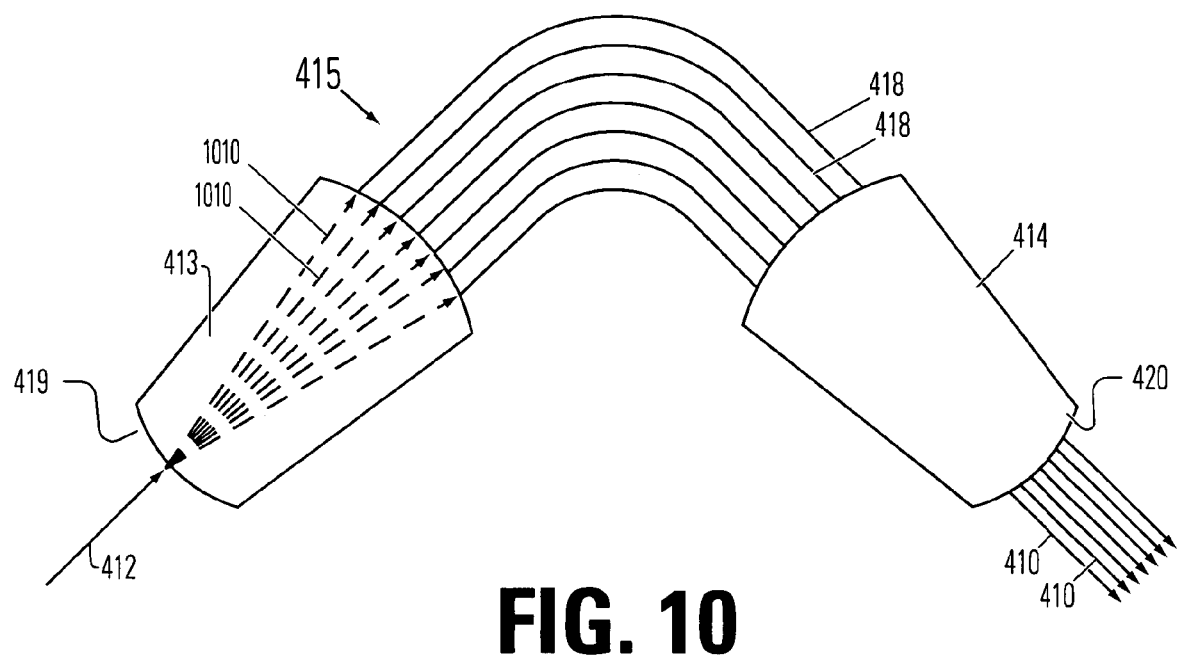
FIG. 10 illustrates ray-approximations of optical paths in the AWG of FIG. 4.

The drawings of FIGS. 9A-9F for simplicity of discussion illustrate the slots as triangles. It is to be understood, however, that strictly triangular compensation regions would provide a constant $\Delta L_x$ across the different optical paths only if the optical paths are parallel to each other. FIG. 10 illustrates ray-approximations (dashed lines 1010) through the slab region 413 of the AWG of FIG. 4 for several ones of the optical paths, and it can be seen that light propagates radially from the entry point from input waveguide 412 toward the arc-shaped output surface of the slab 413, rather than propagating in parallel. In order for each slot to provide a constant $\Delta L_x$ across the different optical paths, a curved triangular slot shape can be used.

Figure 10A:
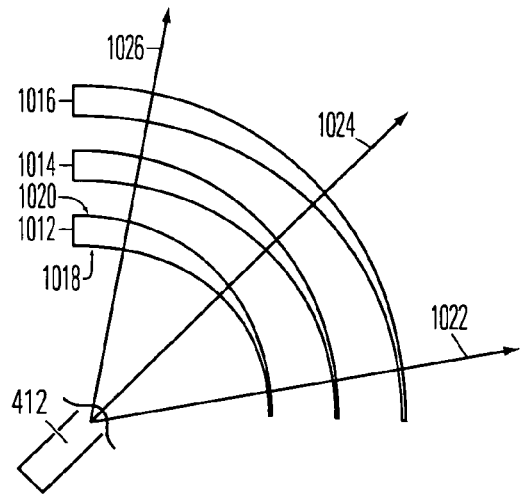
Figure 10B:
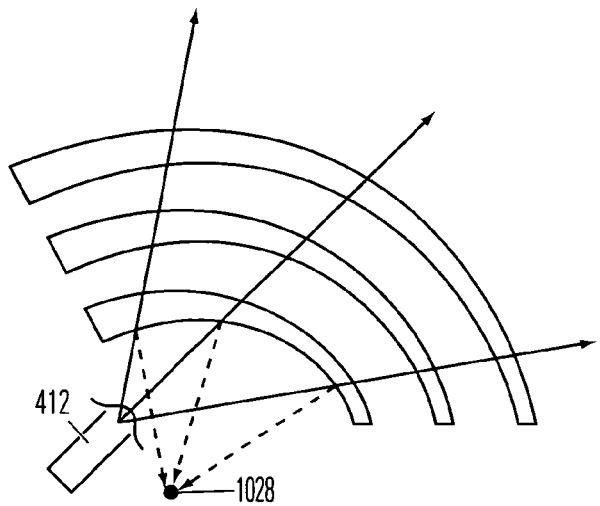

FIG. 10A illustrates one such arrangement. The drawing shows three slots each having a curved triangular shape such that the different optical path ray-approximations experience a constant physical path length increment through each slot. The leading edge of each slot (e.g. edge 1018 for slot 1012) forms an arc having a centerpoint slightly offset in one lateral direction from the entry point of from the input waveguide 412, and the trailing edge of each slot (e.g. edge 1020 for slot 1012) forms another arc having a centerpoint slightly offset in the other lateral direction from the entry point of from the input waveguide 412. Three ray-approximation paths 1022, 1024 and 1026 are shown in FIG. 10A. A problem with the roughly concentric slot arrangement of FIG. 10A is that optical energy that reflects back from slot edges will refocus roughly at the input waveguide 412 entry point and back into the waveguide 412. Slanted slot edges as illustrated in FIG. 5 may alleviate this problem. Alternatively or additionally, the slots can be formed concentrically as shown in FIG. 10A but with a centerpoint that is offset from the waveguide 412 entry point. In this case reflected optical energy will refocus at another point 1028, away from the waveguide 412. Note that the optical path ray-approximations do not traverse the slots radially in the arrangement of FIG. 10B. Geometric calculations are required to determine the proper shape of the slots in order to provide a constant physical path length increment across the different optical paths.

Figure 10C:
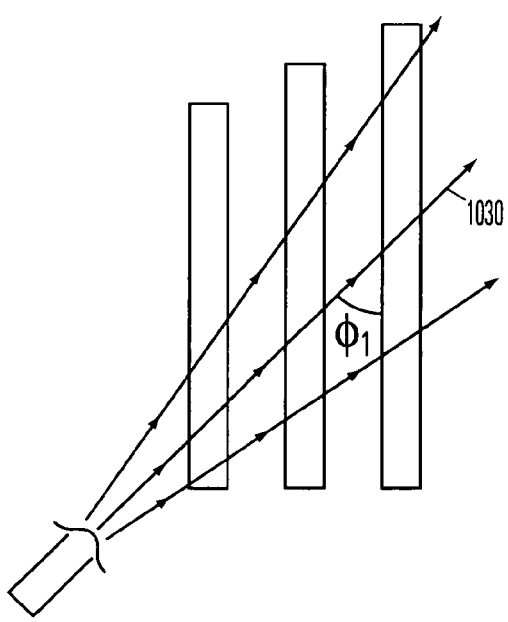

FIG. 10C illustrates yet another possible arrangement, in which the compensation regions have an elongated rectangular shape rather than a curved triangular shape. In order to provide greater physical interaction lengths for optical paths at the top of the illustration than at the bottom, the rectangles are tilted to an acute angle $\phi_1$ relative to the central optical path 1030. Note that in FIG. 10C the refractive bending of the optical paths due to a higher index compensation material in the compensation regions is evident. These effects, which are also present in other arrangements though not necessarily shown explicitly in the figures herein, should be taken into account when calculating the actual physical path length of each optical path through the compensation regions.

Figure 10D:
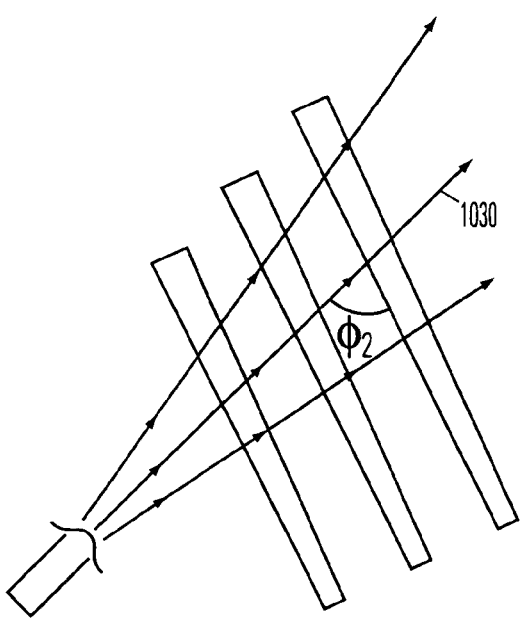

FIG. 10D illustrates a variation on the arrangement of FIG. 10C, in which slots are more triangular in shape and oriented at a larger acute angle $\phi_2$ relative to the central optical path 1030. Again, geometric calculations will determine both the appropriate taper of the triangles and the appropriate orientation angle $\phi_2$ in order to provide a constant physical path length increment across the different optical paths. Numerous other variations will be apparent.

Compensation Material Structural Variations

Variations are also possible in the structure and content of the compensation materials used to fill the slots 430. FIGS. 11A-11H illustrate a number of these variations. These figures are cross-sectional views of a single one of the slots, taken along, for example, the central optical path traversing the slab waveguide 413. The basic configuration as shown in FIG. 5 is repeated in FIG. 11A. It can be seen that the slot 430 extends down well below the core level 512 of the planar waveguide 413, and is filled entirely with material A. Waveform 1110 symbolizes the vertical optical intensity distribution of the propagating energy, which is roughly Gaussian and centered roughly within the core layer 512. It can be seen that the material A slot extends down so as to affect substantially all of the propagating optical energy. FIG. 11B is a cross-sectional view of the arrangement of FIG. 9A, in which the two materials are deposited side-by-side with a single slot.

Figure 11A:
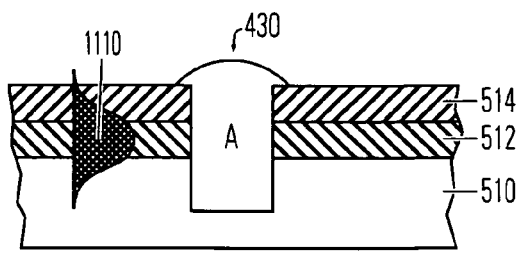
FIGS. 11A-11H illustrate various arrangements of compensation materials in compensation regions of an AWG.
Figure 11D:
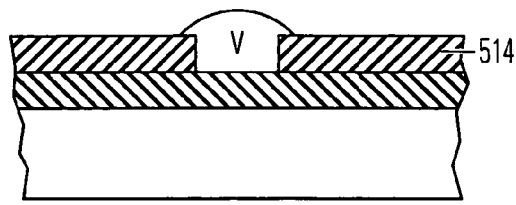
Figure 11B:
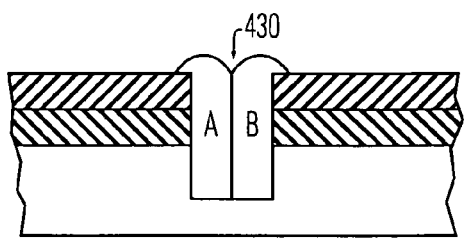
Figure 11E:
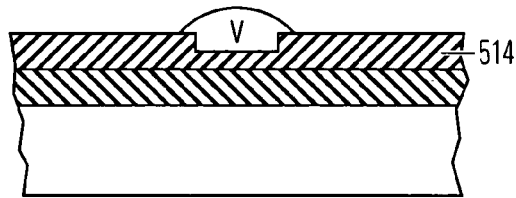
Figure 11C:
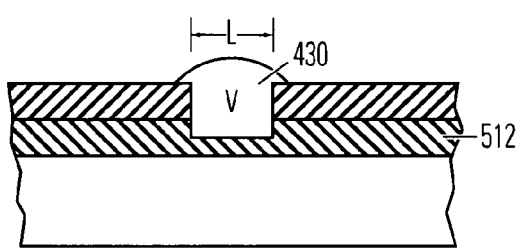
Figure 11F:
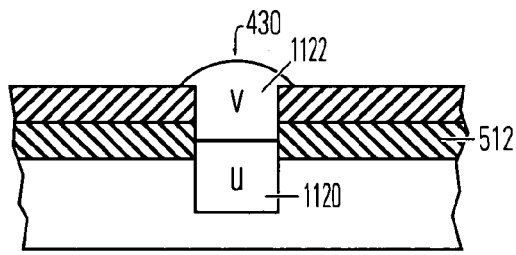

In FIG. 11F, the slot is etched to approximately the same depth as that of FIG. 11A, but it is filled with materials in two layers. First a material U is deposited in a bottom layer 1120 of the slot 430, and then another material V is deposited in a top layer 1122. Material U is cured or otherwise stabilized before the deposition of material V, so as to minimize or eliminate any interaction between the index properties of the two materials U and V. Since the material U affects only some fraction a of the energy propagating along the optical path, and the remainder of the energy is affected by the material V, the combination of materials U and V in slot 430 effectively forms a composite compensation material having an effective index of refraction temperature dependency given by $\alpha dn_U/dT+(1-\alpha)dn_V/dT$, for some value of $\alpha$. The structure of FIG. 11F thereby provides a mechanism for engineering a composite compensation material having a desired index of refraction temperature dependency. For example, if it is desired to use a compensation material A having a particular effective index of refraction temperature dependency $dn_A/dT$, and a physical path length increment $\Delta L_A$, such a material can be formed by layering two different materials U and V as shown in FIG. 11F, with relative thicknesses and depths appropriate to obtain an appropriate value of $\alpha$. When a compensation material is engineered in this way, the $\alpha$ parameter might be used to determine the effective index of refraction temperature dependency only approximately. Preferably, the index of refraction temperature dependency of the combined material is determined experimentally in the same manner as described above for the use of pure fill materials. As used herein, the term "material" can be made up of one or more other materials (which are sometimes referred to herein as "sub-materials"), either mixed together, or layered, or combined in some other manner to make the overall "material". In FIG. 11F, they are layered.

Compensation material structures such as that shown in FIG. 11F can also be used natively to satisfy the athermality equations herein. That is, if two compensation materials A and B are to be used, then instead of allocating different ones of the compensation regions entirely to either material A or material B, a structure like FIG. 11F can be used in which all the compensation regions each contain both material A and material B in layers. Mathematically, the effect can be reflected in the equations by substituting for each of the physical path length increment variables $\Delta L_x$ an effective path length increment for the material X that is shorter (in the propagation direction) than the physical path length increment. That is, one can substitute $\Delta L_{Aeff} \alpha \Delta L_A$ and $\Delta L_{Beff} = (1-\alpha)\Delta L_B$ for $\Delta L_A$ and $\Delta L_B$ in the equations above. Once desired values have been calculated for $\Delta L_{Aeff}$ and $\Delta L_{Beff}$ using the equations above, and recognizing that $\Delta L_A = \Delta L_B$ since both materials share the same slots, $\Delta L_x$ and $\alpha$ can then be calculated. Alternatively, the effect can be reflected in the equations by substituting $\alpha dn_A/dT$ for $dn_A/dT$ and substituting $(1-\alpha) dn_B/dT$ for $dn_B/dT$. The equations above are then used to calculate values for $\Delta L_A$ and $\Delta L_B$, and then a value can be calculated for $\alpha$ by again recognizing that $\Delta L_A = \Delta L_B$.

Figure 11G:
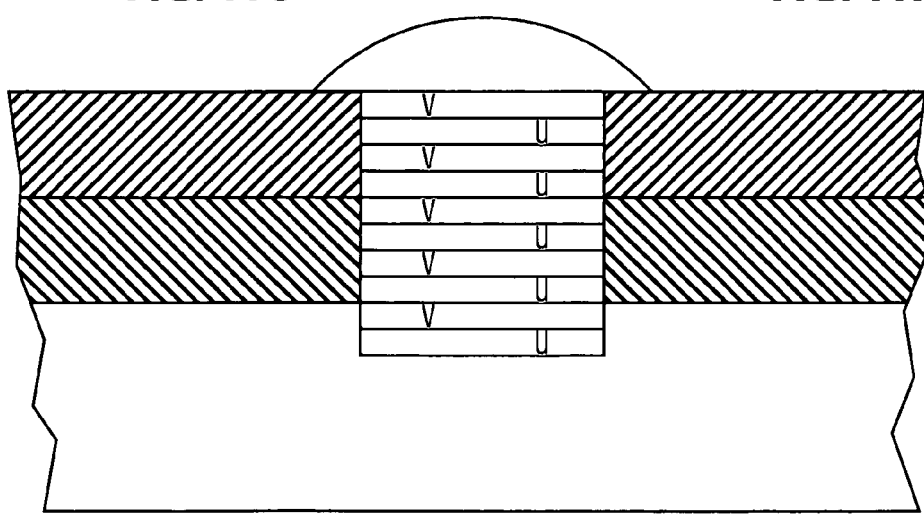
Figure 11H:
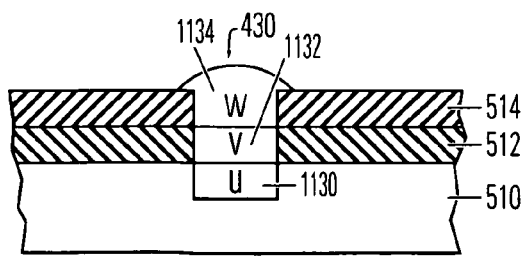

Depending on the indices of refraction of materials U and V, The structure of FIG. 11F may introduce insertion losses due to undesirable guiding of the optical energy vertically either up or down as it crosses the slot 430. This disadvantage may be reduced by depositing the materials U and V in multiple very thin layers as shown in FIG. 11G, instead of in only two layers as shown in FIG. 11F. Alternatively, as shown in FIG. 11H, a composite material can be filled into slot 430 using three layers: one layer 1130 disposed entirely within the lower cladding 510 of the glass material, a second layer 1132 disposed at a depth in the slot substantially coinciding with that of the core layer 512, and a third layer 1134 entirely within the top cladding layer 514. The three layers may be filled with different materials U, V and W, or the material in layer 1134 may be chosen to be the same as that in layer 1130. The material in layer 1132 has a higher index of refraction than that of the materials in layers 1130 and 1134, so as to continue to guide the optical energy as it crosses the slot 430. The overall "material" in slot 430 in FIG. 11H has an effective index of refraction temperature dependency given approximately by $\alpha_U dn_U/dT + \alpha_V dn_V/dT + (1-\alpha_U - \alpha_V) dn_W/dT$.

In FIG. 11C, the slot 430 extends down only partially into the core layer 512. This variation can be thought of as similar to that of FIG. 11F, in which the lower material U is the volume of base material below the bottom of the slot 430. If the equations indicate that a compensation material A should be interposed along a segment of length L in the optical path, then instead a different material V can be interposed along the segment of length L, but only to a partial depth. The "material" A is then considered herein to be the layered composite of material V and the volume of base material below the bottom of slot 430.

FIG. 11D illustrates the same principle as FIG. 11C, but in FIG. 11D the slot is etched only down through the top cladding layer 514. This embodiment results in a smaller $\alpha$, but is otherwise similar to that of FIG. 11C. In FIG. 11E, the slot is etched down only through part of the top cladding layer 514. This embodiment results in an a that is even smaller than that of FIG. 11D, but again is otherwise similar to that of FIGS. 11C and 11D. It will be appreciated that any number of different materials can be combined in ways shown in FIGS. 11A-11H to create effective materials, and the mechanisms illustrated in these figures themselves can be combined with each other to create still other examples for filling the slots 430. Many variations will be apparent.

Mechanical Compensation

The techniques described herein for improving the athermalization of optical grating devices are not limited to the insertion of different materials in temperature compensation regions. Some of the techniques can also be applied to improve other athermalization mechanisms, including mechanical mechanisms. It is known, for example, that if an input/output waveguide carrying optical energy into or out of the input or output coupling region of an AWG, is shifted laterally, the AWG passbands will also shift. It is known further to affix the input/output waveguide to a temperature dependent positioning mechanism, such as a bi-metallic strip, to thereby shift the lateral position of the waveguide relative to the coupling region automatically with temperature in order to compensate for the temperature dependency of the remainder of the AWG. However, as with other conventional mechanisms, only first order temperature effects are taken into account.

Figure 12:
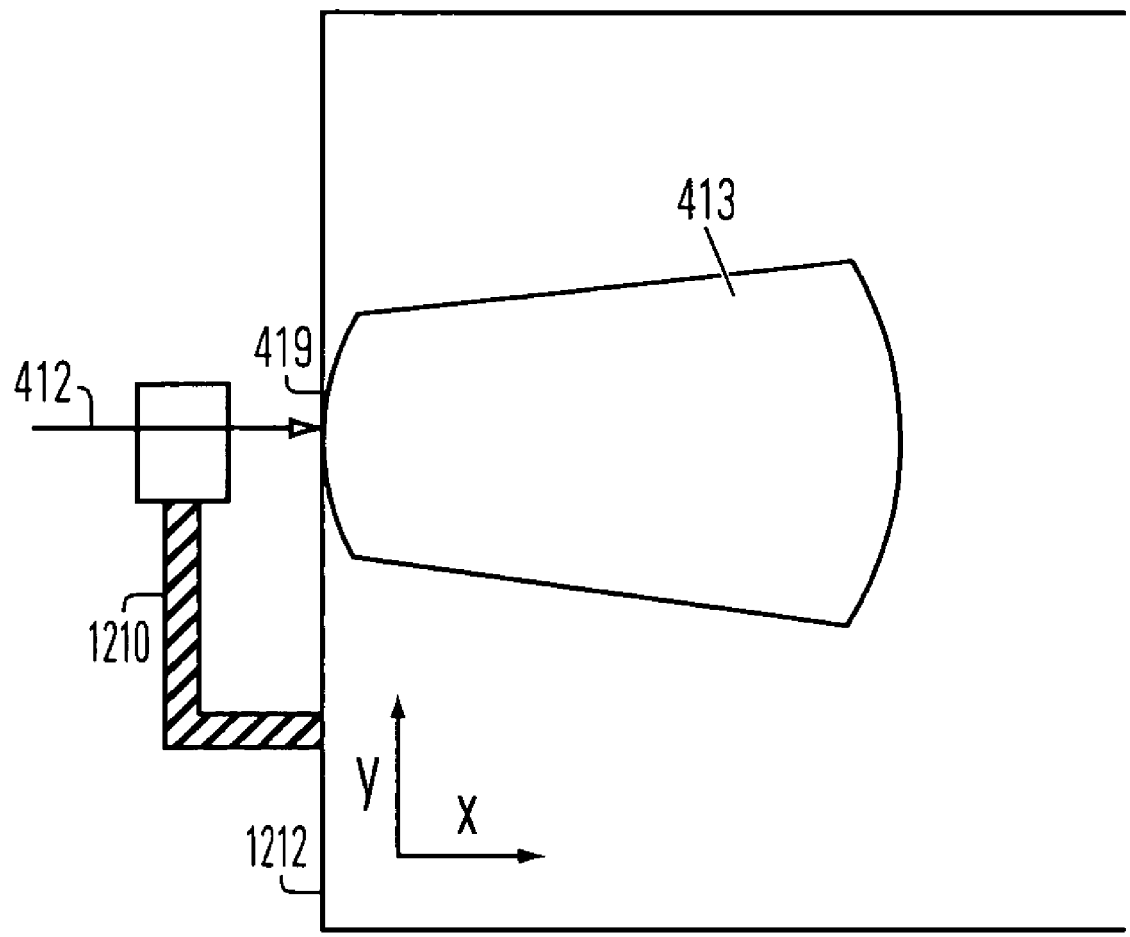
FIG. 12 illustrates a portion of an optical apparatus incorporating aspects of the invention.

FIG. 12 illustrates a portion of an AWG that performs mechanical center wavelength stabilization using features of the present invention. In particular, FIG. 12 shows an input coupling region 413 and an input fiber 412 coupling input optical energy into the input face 419 of the coupling region 413. The fiber is not itself attached to the input face 419, but rather is attached to one end of an arm 1210. The opposite end of the arm 1210 is attached to the chip 1212 on which the input coupling region 413 is integrated. The arm 1210 is constructed and oriented so as to position the fiber 412 laterally relative to the chip 1212 (i.e. in the y-direction as shown in the figure) in dependence upon ambient temperature. For example, a bi-metallic actuator can be used in the arm 1210. Unlike conventional mechanically athermalized systems, the shape and construction of the arm 1210 is such as to compensate for temperature-dependent center wavelength shifts of order Q, where Q>=2. In particular, the arm 1210 maintains the fiber 412 at a lateral position y that is given by:

$$y = \sum_{q=0}^{Q} k_q T^q, Q >= 2. \quad (eq. 41)$$

For second order compensation (Q=2), $k_1$ and $k_2$ may be given by:

$$\frac{k_1}{k_2} = \frac{n_{1g}}{n_{2g}}. \quad (eq. 42)$$

Note that a mechanical technique can also be used in conjunction with a technique in which different materials are inserted into the optical paths, in which case Q=1 might suffice as well. Again, many other applications are possible which use aspects of the present invention.

Practical Considerations

In a real device making use of the concepts described herein, it will be appreciated that it may be either impossible or commercially unnecessary to match the equations set forth above exactly. For example, the devices may deviate from the equations due to ordinary manufacturing tolerances. As another example, since the total number of slots available is an integer, the ratio of the number of slots filled with one polymer to the number filled with the other may not be exactly equal to the ratio of $\Delta L$'s derived above. A real device which deviates from the equations set forth above for any of these reasons, is considered herein still to satisfy the equations "substantially". Since such devices still make use of the novel concepts taught herein they can be made with much better athermality than conventional devices, even though they do not satisfy the equations exactly.

In addition, whereas athermality can be optimized by using the equations and techniques described herein, it will be appreciated that an embodiment can still make great improvements in athermality over conventional methods if the equations and techniques described herein are used only partially, or with a small spoiling factor. For example, where the index of refraction temperature dependency is modeled using a polynomial of order Q>1, and where a material system is to be used having a particular number of materials X, (eq.37) can be used to solve for an optimum vector $\Delta L$. But a similar equation $$N \cdot \Delta L = p \quad (eq.43)$$

can be used instead, where p is a small number that still yields an AWG having substantially better athermality than possible using conventional methods. Whereas a linear, one-polymer solution likely cannot produce an AWG having a center wavelength variation less than about 70 pm over temperature range −50 C to +90 C, or a center wavelength variation less than about 20 pm over temperature range 0C to +70 C, a second order, two-polymer embodiment developed using (eq.37) might reduce the center wavelength variation to less than about 40 pm over the temperature range −50 C to +90 C, or to less than about 10 pm over temperature range 0C to +70 C. But an embodiment developed using (eq.43), where p is not exactly zero but is still relatively small, might still reduce the center wavelength variation below the conventionally available amounts above, even though it does not produce the optimum results obtained using (eq.37). Embodiments such as this are still considered herein to take advantage of the equations and techniques described herein.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, whereas the invention has been described primarily with respect to AWG multiplexer/de-multiplexers, it can also be applied for other optical devices such as, without limitation, free space grating devices such as those described in Amersfoort U.S. Pat. No. 5,629,992, incorporated herein by reference. As another example, one or more of the materials in a slot may perform a function of birefringence compensation, either additionally to or instead of thermal compensation (see U.S. Pat. No. 6,757,454, incorporated by reference herein). In addition, any and all variations described, suggested or incorporated by reference in the Background section or any other section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. Optical apparatus including an output port in optical communication with an input port via an arrayed waveguide grating, the apparatus having a plurality of passbands including a subject passband, the subject passband having a center wavelength,
    wherein the first through Q'th order derivatives with respect to temperature of the center wavelength, Q>=2, are substantially equal to zero throughout a temperature range of −5 C to +70 C.

2. Apparatus according to claim 1, wherein the first through Q'th order derivatives are substantially equal to zero throughout a temperature range of −30 C to +70 C.

3. Apparatus according to claim 1, comprising a plurality of optical paths carrying optical energy from the input port to the output port through a plurality of materials, each of the materials having an effective index of refraction temperature dependency which differs from that of the other materials.

4. Apparatus according to claim 1, comprising:
    a waveguide in optical communication with a particular one of the input and output ports; and
    a temperature compensation member that adjusts the physical position of the waveguide with respect to the arrayed waveguide grating in dependence upon temperature.

5. Optical apparatus comprising a plurality of optical paths through a material system, each of the optical paths having a respective effective optical path length which differs from that of an adjacent optical path by a respective effective optical path length difference,
    wherein the first through Q'th order derivatives with respect to temperature of each of the optical path length differences, Q>=2, are substantially equal to zero throughout a temperature range of −5 C to +70 C.

6. Apparatus according to claim 5, wherein the first through Q'th order derivatives are substantially equal to zero throughout a temperature range of −30 C to +70 C.

7. Apparatus according to claim 5, wherein each of the optical paths traverses a plurality of materials, each of the materials having an effective index of refraction temperature dependency which differs from that of the other materials.

8. Optical apparatus comprising a plurality of optical paths through a material system,
the material system including core and cladding materials which confine the optical paths in at least one dimension,
each of the optical paths traversing at least two additional materials other than the core and cladding materials,
each of the additional materials having an effective index of refraction temperature dependency which differs from those of the core and cladding materials and of the other materials,
each of the optical paths having a respective effective optical path length which differs from that of an adjacent optical path by a respective effective optical path length difference,
wherein the first through Q'th order derivatives with respect to temperature of each of the optical path length differences, Q>=1, are substantially equal to zero throughout a temperature range of −5 C to +70 C.

9. Apparatus according to claim 8, wherein the first through Q'th order derivatives are substantially equal to zero throughout a temperature range of −30 C to +70 C.

10. Arrayed waveguide grating apparatus having a plurality of optical paths from an input to an output, comprising a base material and a compensation region set containing at least one compensation region, the compensation region set containing at least first and second temperature compensation materials intersecting the optical paths and having effective index of refraction temperature dependencies that differ from each other and from that of the base material.

11. Apparatus according to claim 10, wherein the compensation region set contains a first compensation region which includes both the first and second compensation materials.

12. Apparatus according to claim 11, wherein the first and second compensation materials are disposed in different layers in the first compensation region.

13. Apparatus according to claim 11, wherein the first compensation region further includes a third compensation material,
wherein the first compensation material is disposed in a lower layer in the first compensation region, the second compensation material is disposed in a middle layer in the first compensation region, and the third compensation material is disposed in an upper layer in the first compensation region,
and wherein the second compensation material has an index of refraction higher than both that of the first and third compensation materials.

14. Apparatus according to claim 13, wherein the arrayed waveguide grating apparatus includes in the base material a lower cladding layer, a core layer superposing the lower cladding region and an upper cladding layer superposing the core layer,
wherein the second compensation material is substantially coplanar with the core layer in the base material.

15. Apparatus according to claim 10, wherein the compensation region set contains a first compensation region which includes the first compensation material and not the second compensation material.

16. Apparatus according to claim 10, wherein the compensation region set includes a plurality of compensation regions,
wherein the compensation region set contains a plurality of compensation materials including the first and second compensation materials,
wherein all of the compensation materials in the plurality of compensation materials intersect the optical paths and have effective index of refraction temperature dependencies that differ from each other and from that of the base material,
and wherein each of the compensation regions includes exactly one of the compensation materials.

17. Apparatus according to claim 10, wherein the first compensation material comprises a composite plurality of sub-matefais, the effective index of refraction temperature dependence of the composite being the effective index of refraction of the first compensation material.

18. Apparatus according to claim 17, wherein the sub-materials are layered to form the composite.

19. Apparatus according to claim 17, wherein a first one of the sub-materials is the same as the base material and a second one of the sub-materials has an effective index of refraction temperature dependence that differs from that of the base material and from that of the composite.

20. Apparatus according to claim 10, wherein the first compensation material further compensates for bi-refringence of the base material.

21. Arrayed waveguide grating apparatus having a plurality of optical paths from an input to an output, comprising a base material and a plurality of compensation regions, a first subset of at least one of the compensation regions containing a first temperature compensation material and a second subset of at least one of the compensation regions containing a second temperature compensation material, wherein the first and second temperature compensation materials have effective index of refraction temperature dependencies that differ from each other and from that of the base material.

22. Apparatus according to claim 21, wherein the base material comprises a silica and the first and second compensation materials are polymers.

23. Optical apparatus comprising an arrayed waveguide grating device, including an output port in optical communication with an input port via an arrayed waveguide grating,
wherein the apparatus has a plurality of passbands including a subject passband, the subject passband having a center wavelength,
and wherein the overall variation of center wavelength is less than 70 pm throughout the temperature range −50 C to +90 C.

24. Apparatus according to claim 23, wherein the center wavelength varies by no more than 40 pm over temperature range −50 C to +90 C.

25. Optical apparatus comprising an arrayed waveguide grating device, including an output port in optical communication with an input port via an arrayed waveguide grating,
wherein the apparatus has a plurality of passbands including a subject passband, the subject passband having a center wavelength,
and wherein the overall variation of center wavelength is less than 20 pm throughout the temperature range 0 C to +70 C.

26. Apparatus according to claim 25, wherein the center wavelength varies by no more than 10 pm over temperature range 0 C to +70 C.

27. Apparatus according to claim 3, wherein the plurality of materials comprises at least one silica material and at least two polymer materials.

28. Apparatus according to claim 7, wherein the plurality of materials comprises at least one silica material and at least two polymer materials.

29. Apparatus according to claim 8, wherein the core material comprises a silica and at least two of the additional materials comprise polymers.

30. Optical apparatus comprising a plurality of optical paths through a material system, each of the optical paths traversing a number X materials, and wherein $$\begin{pmatrix} n_{1,0} & n_{1,1} & \ldots & n_{1,X-1} \\ n_{2,0} & n_{2,1} & \ldots & n_{2,X-1} \\ \vdots & \vdots & & \vdots \\ n_{Q,0} & n_{Q,1} & \ldots & n_{Q,X-1} \end{pmatrix} \cdot \begin{pmatrix} \Delta L_0 \\ \Delta L_1 \\ \vdots \\ \Delta L_{X-1} \end{pmatrix}$$

is substantially equal to zero,
where each $n_{q,x}$ is a q'th derivative with respect to temperature of the effective index of refraction of each x'th one of the materials,
where each $\Delta L_x$ is the total physical path length increment of the material x between adjacent optical paths,
and wherein Q>=2.

31. Apparatus according to claim 30, wherein X>=3.

32. Apparatus according to claim 30, wherein X>=Q+1.

33. Apparatus according to claim 32, wherein the X materials consist of a base material and X−1 compensation materials,
the apparatus comprising at least X−1 compensation regions formed in the base material, each of the compensation regions containing exactly one of the compensation materials, the compensation regions being allocated to the X−1 compensation materials substantially in proportion to the total physical path length increments $\Delta L_x$ of the compensation materials.

34. Apparatus according to claim 33, wherein the base material comprises a silica and each of the compensation materials comprises a polymer.

35. Optical apparatus comprising a plurality of optical paths through a material system, each of the optical paths traversing a number X materials, and wherein $$\begin{pmatrix} n_{1,0} & n_{1,1} & \ldots & n_{1,X-1} \\ n_{2,0} & n_{2,1} & \ldots & n_{2,X-1} \\ \vdots & \vdots & & \vdots \\ n_{Q,0} & n_{Q,1} & \ldots & n_{Q,X-1} \end{pmatrix} \cdot \begin{pmatrix} \Delta L_0 \\ \Delta L_1 \\ \vdots \\ \Delta L_{X-1} \end{pmatrix}$$

is substantially equal to zero,
where each $n_{q,x}$ is a q'th derivative with respect to temperature of the effective index of refraction of each x'th one of the materials,
where each $\Delta L_x$ is the total physical path length increment of the material x between adjacent optical paths,
wherein Q>=1 and X>=3,
wherein at least one of the materials comprises a silica, and wherein at least two of the materials each comprise a polymer.

36. Apparatus according to claim 10, wherein the optical paths traverse in sequence a first free space region, an arrayed waveguide grating, and a second free space region,
and wherein at least one of the compensation regions is disposed in one of the free space regions.

37. Apparatus according to claim 36, wherein each particular one of the compensation regions is disposed in either the first or the second free space region.

38. Apparatus according to claim 21, wherein the optical paths traverse in sequence a first free space region, an arrayed waveguide grating, and a second free space region,
and wherein at least one of the compensation regions in the first subset is disposed in one of the free space regions.

39. Apparatus according to claim 38, wherein each particular one of the compensation regions in the first and second subsets is disposed in either the first or the second free space region.

* * * * *